(12) United States Patent
Masek et al.

(10) Patent No.: US 12,721,475 B2
(45) Date of Patent: Sep. 1, 2026

(54) FLAT TOP GAS GRILLS INCLUDING COOKING ENGINES CONFIGURED FOR OPTIMUM HEAT DISTRIBUTION

(71) Applicant: Weber-Stephen Products LLC, Palatine, IL (US)

(72) Inventors: Douglas W. Masek, Palatine, IL (US); Curtis P. Menning, Palatine, IL (US); Sebastian Szulakiewicz, Mount Prospect, IL (US); David J. Dominguez, Elgin, IL (US)

( * ) Notice: Subject to any disclaimer, the term of this patent is extended or adjusted under 35 U.S.C. 154(b) by 399 days.

(21) Appl. No.: 18/442,868

(22) Filed: Feb. 15, 2024

(65) Prior Publication Data

US 2025/0261794 A1 Aug. 21, 2025

(51) Int. Cl.

| | |
|---|---|
| ***A47J 37/07*** | (2006.01) |
| ***A47J 37/06*** | (2006.01) |
| ***F24C 3/02*** | (2021.01) |
| ***F24C 3/08*** | (2006.01) |
| *F23D 14/10* | (2006.01) |

(52) U.S. Cl.

CPC ....... *A47J 37/0713* (2013.01); *A47J 37/0682* (2013.01); *A47J 37/0786* (2013.01); *F24C 3/027* (2013.01); *F24C 3/085* (2013.01); *A47J 2202/00* (2013.01); *F23D 14/10* (2013.01)

(58) Field of Classification Search

None

See application file for complete search history.

(56) References Cited

U.S. PATENT DOCUMENTS

| | | | |
|---|---|---|---|
| 1,614,746 | A | 1/1927 | Lyon |
| 3,938,494 | A | 2/1976 | Clark |

(Continued)

FOREIGN PATENT DOCUMENTS

| | | | |
|---|---|---|---|
| RU | 2157485 | C1 | 10/2000 |
| WO | 1998044835 | A1 | 10/1998 |
| WO | 2010065155 | A1 | 6/2010 |

OTHER PUBLICATIONS

International Searching Authority, "International Search Report and Written Opinion," issued in connection with International Patent Application No. PCT/US2024/058078, mailed on May 8, 2025, 12 pages.

(Continued)

*Primary Examiner* — Ko-Wei Lin
(74) *Attorney, Agent, or Firm* — Avantech Law, LLP

(57) ABSTRACT

Flat top gas grills including cooking engines configured for optimum heat distribution are disclosed. An example grill includes a cookbox, a heat shield, a griddle, and a plurality of burner tubes. The cookbox includes a bottom wall, as well as a front wall, a rear wall, a right sidewall, and a left sidewall extending upwardly therefrom. The cookbox further includes a plurality of air intake openings extending though the bottom wall. The heat shield includes a panel spaced apart from and located below the bottom wall of the cookbox. The panel extends across the plurality of air intake openings. The griddle is disposed on or above the cookbox. The griddle includes a flat top cooking surface and an underside located opposite the flat top cooking surface. The burner tubes are disposed in the cookbox and located between the bottom wall of the cookbox and the underside of the griddle.

20 Claims, 19 Drawing Sheets

(56) References Cited

U.S. PATENT DOCUMENTS 4,989,579 A 2/1991 Murphy et al.
6,428,313 B1 * 8/2002 Rodgers .................. F23D 14/10 126/41 R
6,557,546 B1 * 5/2003 Gibbons ............. A47J 37/0713 126/41 R
6,758,207 B1 7/2004 Hotard et al.
7,210,475 B2 5/2007 Barnes et al.
7,832,390 B2 11/2010 Hsu et al.
8,074,563 B2 12/2011 Bowles et al.
8,991,386 B2 3/2015 Ahmed
9,492,032 B2 11/2016 Chung
D792,741 S * 7/2017 Chung ........................... D7/407
9,709,281 B2 7/2017 Ahmed
10,054,310 B2 8/2018 Lirette et al.
10,190,777 B2 1/2019 Ahmed
10,327,588 B2 6/2019 Dahle et al.
10,327,589 B1 6/2019 Dahle et al.
10,520,200 B1 12/2019 Straubel
10,588,461 B2 3/2020 Dahle
10,660,473 B2 * 5/2020 Dahle ................. A47J 37/0682
10,779,682 B2 9/2020 Dahle et al.
10,863,862 B2 12/2020 Querejeta Andueza et al.
10,888,193 B2 1/2021 Dahle et al.
10,952,564 B2 3/2021 Dahle et al.
10,959,572 B2 3/2021 Dahle et al.
10,995,964 B2 5/2021 Dahle
D927,918 S 8/2021 Dahle et al.
11,116,360 B2 9/2021 Dahle et al.
11,116,361 B2 9/2021 Dahle et al.
11,197,580 B2 12/2021 Dahle et al.
11,202,532 B2 12/2021 Dahle et al.
D940,496 S 1/2022 Wang
11,284,743 B2 3/2022 Dahle et al.
11,311,147 B2 4/2022 Dahle
11,607,079 B2 3/2023 Dahle et al.
11,641,977 B2 5/2023 Dahle et al.
11,700,971 B2 7/2023 Dahle et al.
11,725,831 B2 8/2023 Dahle
11,751,723 B2 9/2023 Dahle et al.
11,759,050 B2 9/2023 Dahle et al.
2002/0132198 A1 9/2002 O'Donnell et al.
2003/0213484 A1 11/2003 Alden et al.
2008/0081308 A1 * 4/2008 Witzel .................... F23D 14/62 431/354
2009/0165774 A1 7/2009 Johnston et al.
2009/0202688 A1 8/2009 Best
2009/0205631 A1 8/2009 Tsung
2009/0250048 A1 * 10/2009 Educate .................. F23D 14/46 431/258
2009/0308264 A1 12/2009 Estess et al.
2010/0095951 A1 * 4/2010 Ahmed ............... A47J 37/0713 126/39 D
2010/0175682 A1 7/2010 Erikson et al.
2010/0326417 A1 12/2010 Groth et al.
2012/0266856 A1 10/2012 Zelek et al.
2012/0318256 A1 12/2012 Chilton et al.
2013/0087136 A1 4/2013 Ahmed
2013/0228161 A1 9/2013 Ahmed
2014/0144333 A1 5/2014 Ahmed
2016/0370012 A1 * 12/2016 Chung .................. F23D 14/105
2017/0251875 A1 9/2017 Robinson
2018/0070770 A1 * 3/2018 Ahmed ................... F23D 14/70
2018/0353005 A1 12/2018 Lee et al.
2019/0075968 A1 3/2019 Koehn
2019/0110641 A1 4/2019 Lee et al.
2019/0128538 A1 * 5/2019 Dahle ..................... F24C 15/28
2019/0274477 A1 * 9/2019 Querejeta Andueza ..................... F23N 1/007
2019/0293299 A1 9/2019 Lee
2019/0298108 A1 * 10/2019 Dahle ................. A47J 37/0786
2019/0313849 A1 * 10/2019 Yin ..................... A47J 37/0713
2020/0093330 A1 * 3/2020 Dahle ..................... F24C 15/18
2020/0253420 A1 8/2020 He et al.
2021/0007550 A1 * 1/2021 Puertas ............... A47J 37/0704
2021/0145012 A1 * 5/2021 Hoodenpyl .......... A23B 4/0523
2021/0244233 A1 * 8/2021 Bush, III ............ A47J 37/0682
2021/0315416 A1 * 10/2021 Fullmer .................. F24C 7/067
2021/0353098 A1 11/2021 Huang
2022/0022688 A1 1/2022 Barajas, Jr. et al.
2022/0071445 A1 * 3/2022 Springer ............. A47J 37/0786
2022/0082264 A1 * 3/2022 O'Daniel .................. F24C 3/14
2022/0133090 A1 5/2022 Shen
2022/0279962 A1 * 9/2022 Vandyke ................. A47J 36/32
2022/0299207 A1 9/2022 Bennett
2022/0304504 A1 9/2022 Simon et al.
2022/0304507 A1 9/2022 Simon et al.
2022/0338673 A1 10/2022 Graham et al.
2022/0364723 A1 * 11/2022 Tunstall .................. F23D 14/76
2022/0386813 A1 12/2022 Graham et al.
2023/0000284 A1 * 1/2023 Smith ................. A47J 37/0763
2023/0031340 A1 * 2/2023 Dahle ................. A47J 37/0713
2023/0091290 A1 * 3/2023 Levien ...................... F23N 1/00 426/231
2023/0284829 A1 * 9/2023 Dahle ................. A47J 37/0713
2023/0284830 A1 9/2023 Smith
2023/0320527 A1 10/2023 Dunker
2024/0138618 A1 * 5/2024 Smith .................. A47J 37/067
2024/0219032 A1 7/2024 Hanks et al.
2024/0285121 A1 8/2024 Barajas, Jr. et al.
2024/0374082 A1 11/2024 Graham et al.
2024/0407600 A1 12/2024 Dahle et al.
2025/0082132 A1 3/2025 Bush, III et al.
2025/0120544 A1 4/2025 Ciccone et al.
2025/0213068 A1 7/2025 Dahle et al.

OTHER PUBLICATIONS

Australian Government, IP Australia, "Examination Report No. 1," issued in connection with Australian Patent Application No. 2023254906, dated Jan. 7, 2025, 3 pages.

A-0060-MAN Heatlie Community Barbecue Instruction Manual V3, dated Feb. 2022, 16 pages, available at: https://cdn.shopify.com/s/files/1/0645/7412/8364/files/Community_BBQ_Series_-_CBBQ600_Written_User_Instructions_Revision_3_Updated_7-10-12.pdf?v=1670989943.

Canadian Intellectual Property Office, "Office Action No. 1," issued in connection with Canadian Patent Application No. 3,217,873, dated Mar. 4, 2025, 4 pages.

Australian Government, IP Australia, "Notice of Acceptance," issued in connection with Australian Patent Application No. 2023254906, dated Mar. 27, 2025, 3 pages.

Weber, Weber 28" Griddle, accessed on Feb. 15, 2024 from https://www.weber.com/US/en/griddle/stand-up-griddles/weber-griddle-28/43310201.html.

Weber, Weber 36" Griddle, accessed on Feb. 15, 2024 from https://www.weber.com/US/en/griddle/stand-up-griddles/weber-griddle-36/44310401.html.

Weber, Slate 30" Rust-Resistant Griddle, accessed on Feb. 15, 2024 from https://www.weber.com/US/en/griddle/stand-up-griddles/slate-30-rust-resistant-griddle/1500014.html.

Weber, Slate 36" Rust-Resistant Griddle, accessed on Feb. 15, 2024 from https://www.weber.com/US/en/griddle/stand-up-griddles/slate-36-rust-resistant-griddle/1500216.html.

* cited by examiner

102

358
326
324
328
354
346
308
334
330
316
306
312
332
350
358
342
302
344
358
352
140
336
338
340
310
356
348
314
304
322
226
320
318
358

102
346
312
308
804
702
306
704
706
204
708
344
302
342
202
802
502
314
310
304
348

1310
308
346
B
C
1308
1304
1302
306
104
2202
2204
1312
310
348
120
102
304
110
116
114
1306
112

SECTION B-B

SECTION D-D

FLAT TOP GAS GRILLS INCLUDING COOKING ENGINES CONFIGURED FOR OPTIMUM HEAT DISTRIBUTION

FIELD OF THE DISCLOSURE

This disclosure relates generally to flat top gas grills and, more specifically, to flat top gas grills including cooking engines configured for optimum heat distribution.

BACKGROUND

Many conventional gas grills are equipped with grated cooking surfaces formed by a plurality of interconnected rungs and/or grate members that are spaced apart from one another to form a framework having many openings. Unlike gas grills that are equipped with such grated cooking surfaces, flat top gas grills instead include a griddle configured as a generally continuous and flat cooking surface that optionally includes a small number of openings (e.g., typically one or two openings) extending therethrough, with such openings being configured to receive grease, residue, particles, and/or other byproducts associated with a cooking operation performed on the griddle. While a griddle can be used to cook many different types and/or sizes of food items, implementing a griddle as the cooking surface of the gas grill can be particularly advantageous when it comes to cooking liquid or semi-liquid food items (e.g., eggs, batter, etc.) and/or small pieces of food items (e.g., ground meat, diced or chopped vegetables, etc.) that would otherwise be prone to falling through one or more of the many openings of a typical grated cooking surface.

The cooking engine of a flat top gas grill conventionally includes a cookbox, a griddle disposed on or above the cookbox, and one or more gas-fueled burner tube(s) disposed in the cookbox at a location between a bottom wall of the cookbox and an underside of the griddle. Cooking operations performed on flat top gas grills are typically carried out with a lid of the grill either removed from the cookbox or placed in an open position relative to the cookbox. The absence of a lid during cooking operations can lead to substantial heat loss from the cookbox and/or the griddle, and can also lead to the formation of significant heat distribution and/or temperature variations (e.g., the presence of cold spots and/or hot spots) across the cooking surface of the griddle. In many commercially available flat top gas grills, such variations can exceed two hundred degrees Fahrenheit (200° F.), even in instances when all of the burner tubes are adjusted to the same output setting. Consumers often find such extreme variations to be undesirable and/or unacceptable.

Figure 1:
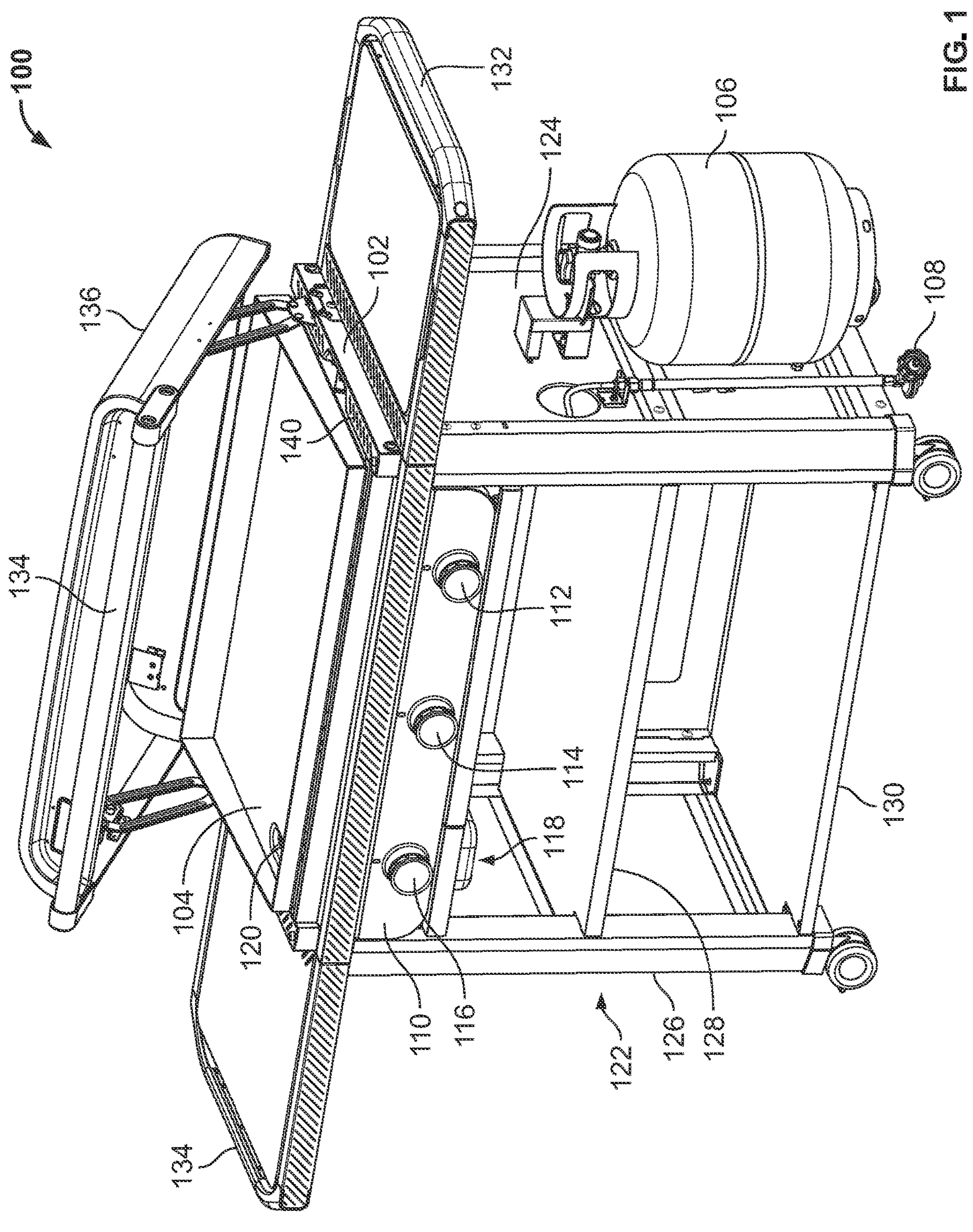
FIG. 1 is a perspective view of an example grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, the cooking engine of a flat top gas grill conventionally includes a cookbox, a griddle disposed on or above the cookbox, and one or more gas-fueled burner tube(s) disposed in the cookbox at a location between a bottom wall of the cookbox and an underside of the griddle.

Cooking operations performed on flat top gas grills are typically carried out with a lid of the grill either removed from the cookbox or placed in an open position relative to the cookbox. The absence of a lid during cooking operations can lead to substantial heat loss from the cookbox and/or the griddle, and can also lead to the formation of significant heat distribution and/or temperature variations (e.g., the presence of cold spots and/or hot spots) across the cooking surface of the griddle.

For example, cooking operations performed on many commercially-available flat top gas grills can generate heat distribution and/or temperature variations in excess of two hundred degrees Fahrenheit (200° F.) across the cooking surface of the griddle, even in instances when all of the gas-fueled burner tubes of the flat top gas grill are adjusted to the same output setting (e.g., all burner tubes adjusted to a LOW output setting, all burner tubes adjusted to a MEDIUM output setting, or all burner tubes adjusted to a HI output setting). In addition to making the cooking process highly inefficient, heat distribution and/or temperature variations of such a stark magnitude can also effectively render portions of the cooking surface of the griddle unusable for their intended purpose, thereby resulting in a less than optimum user experience for the consumer.

Example flat top gas grills including cooking engines configured for optimum heat distribution are disclosed in U.S. patent application Ser. No. 18/380,722, filed on Oct. 17, 2023, the entirety of which is hereby incorporated by reference herein. Example flat top grills of the instant disclosure include several of the features disclosed in U.S. patent application Ser. No. 18/380,722, and further include additional features that provide further and/or alternate optimizations with regard to heat distribution and/or temperature detection.

In some disclosed examples, a grill comprises: (1) a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending though the bottom wall; (2) a heat shield including a panel spaced apart from and located below the bottom wall of the cookbox, the panel extending across the plurality of air intake openings; (3) a griddle disposed on or above the cookbox, the griddle including a flat top cooking surface and an underside located opposite the flat top cooking surface; and (4) a plurality of burner tubes disposed in the cookbox and located between the bottom wall of the cookbox and the underside of the griddle.

In some disclosed examples, the heat shield includes a plurality of openings extending through the panel. In some disclosed examples, the panel of the heat shield is positioned at an angle relative to the bottom wall of the cookbox such that a front edge of the panel is positioned below a rear edge of the panel. In some disclosed examples, the heat shield includes a first mounting flange and a second mounting flange respectively configured to couple the heat shield to the bottom wall of the cookbox.

In some disclosed examples, the plurality of burner tubes includes a first burner tube, a second burner tube laterally spaced apart from the first burner tube, and a third burner tube laterally spaced apart from both the first burner tube and the second burner tube. In some disclosed examples, the plurality of air intake openings includes a first air intake opening and a second air intake opening laterally spaced apart from the first air intake opening. In some disclosed examples, the first air intake opening is laterally positioned between the first burner tube and the second burner tube, and the second air intake opening is laterally positioned between the second burner tube and the third burner tube. In some disclosed examples, the heat shield includes a first plurality of openings and a second plurality of openings respectively extending through the panel. In some disclosed examples, the second plurality of openings is laterally spaced apart from the first plurality of openings. In some disclosed examples, the first plurality of openings includes one or more first openings laterally aligned with the first air intake opening, and the second plurality of openings includes one or more second openings laterally aligned with the second air intake opening.

In some disclosed examples, a grill comprises: (1) a cookbox including a bottom wall, a front wall, a rear wall, a right sidewall, and a left sidewall, the front wall, the rear wall, the right sidewall, and the left sidewall extending upwardly from the bottom wall and defining an upper rim of the cookbox, the upper rim including at least one recess configured to vent heat generated within the cookbox; (2) a griddle disposed on or above the cookbox, the griddle including a flat top cooking surface and an underside located opposite the flat top cooking surface; and (3) a plurality of burner tubes disposed in the cookbox and located between the bottom wall of the cookbox and the underside of the griddle.

In some disclosed examples, the at least one recess includes a first recess located along an inner edge of an upper surface of the front wall, a second recess located along an inner edge of an upper surface of the rear wall, a third recess located along an inner edge of an upper surface of the right sidewall, and a fourth recess located along an inner edge of an upper surface of the left sidewall. In some disclosed examples, the first recess extends between the upper surface of the front wall and an inner surface of the front wall, the second recess extends between the upper surface of the rear wall and an inner surface of the rear wall, the third recess extends between the upper surface of the right sidewall and an inner surface of the right sidewall, and the fourth recess extends between the upper surface of the left sidewall and an inner surface of the left sidewall.

In some disclosed examples, a grill comprises: (1) a cookbox including a bottom wall, a front wall, a rear wall, a right sidewall, and a left sidewall, the front wall, the rear wall, the right sidewall, and the left sidewall extending upwardly from the bottom wall; (2) a griddle disposed on or above the cookbox, the griddle including a flat top cooking surface and an underside located opposite the flat top cooking surface; (3) a plurality of burner tubes disposed in the cookbox and located between the bottom wall of the cookbox and the underside of the griddle; and (4) a temperature sensor assembly coupled to the cookbox, the temperature sensor assembly including a temperature probe configured to contact the underside of the griddle, the temperature probe movable relative to the cookbox between a raised position and a lowered position, the temperature probe biased into the raised position via a spring of the temperature sensor assembly.

In some disclosed examples, the temperature sensor assembly further includes a crossbar and a mounting bracket. The crossbar is coupled to and extends between the front wall and the rear wall of the cookbox. The mounting bracket is coupled to the crossbar. In some disclosed examples, the mounting bracket includes an upper flange and a lower flange spaced apart from the upper flange, wherein the temperature probe is slidingly received in the mounting bracket via an opening formed in the upper flange and an opening formed in the lower flange, the temperature probe including a retention flange located between the upper flange and the lower flange, wherein the spring is operatively positioned between the retention flange of the temperature probe and the lower flange of the mounting bracket such that the spring biases the retention flange of the temperature probe toward the upper flange of the mounting bracket.

In some disclosed examples, the cookbox of the grill is advantageously configured such that an unoccupied area collectively defined by the plurality of air intake openings is between 10.0 and 30.0 percent of the total area of the bottom wall of the cookbox. In some disclosed examples, the cookbox and the burner tubes of the grill are advantageously configured such that respective ones of the air intake openings are laterally positioned between neighboring ones of the burner tubes, and/or such that respective ones of the burner tubes are laterally aligned with a solid portion of the bottom wall of the cookbox that is laterally positioned between neighboring ones of the air intake openings. In some disclosed examples, the cookbox and the griddle of the grill are advantageously configured such that a vertical gap extending between the underside of the griddle and one or more underlying portion(s) of an upper rim of the cookbox is between 0.01 and 1.00 inches, wherein the vertical gap is configured to vent heat generated within the cookbox (e.g., heat generated by one or more of the burner tube(s)).

In some disclosed examples, the cookbox, the griddle, and one or more of the burner tube(s) of the grill are advantageously configured such that a central axis of the burner tube is located between 1.5 and 3.5 inches above the bottom wall of the cookbox, and/or located between 3.0 and 6.0 inches below the underside of the griddle. In some disclosed examples, one or more of the burner tube(s) of the grill include(s) first and second rows of ports extending through an outer wall of the burner tube and respectively arranged parallel to the central axis of the burner tube, wherein the first and second rows of ports are advantageously configured to be angularly displaced from one another by an angle between 90.0 and 150.0 degrees. In some disclosed examples, one or more of the burner tube(s) of the grill include(s) third and fourth rows of ports extending through the outer wall of the burner tube and respectively arranged perpendicular to the central axis of the burner tube, wherein the third row of ports is advantageously configured to be located between 1.0 and 6.0 inches inwardly from a front wall of the cookbox, and wherein the fourth row of ports is advantageously configured to be located between 1.0 and 6.0 inches inwardly from a rear wall of the cookbox.

The above-described features implemented by the disclosed flat top gas grills advantageously improve the operating efficiency of the cooking engine of the flat top gas grill, and advantageously improve the heat distribution properties associated with the griddle of the flat top gas grill. In this regard, the above-described features individually and collectively assist in minimizing any temperature variation across the flat top cooking surface of the griddle during cooking operations performed thereon. Flat top gas grills disclosed herein maintain temperature variations of approximately 150 degrees Fahrenheit (150° F.) or less across the flat top cooking surface of the griddle when the burner tubes of the grill are adjusted to a common output setting. Such temperature variations are substantially less than those found in many commercially available flat top gas grills, some of which produce flat top cooking surface temperature variations exceeding two hundred degrees Fahrenheit (200° F.) when the burner tubes of the flat top gas grill are adjusted to a common output setting.

The above-identified features as well as other advantageous features of example flat top gas grills including cooking engines configured for optimum heat distribution as disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
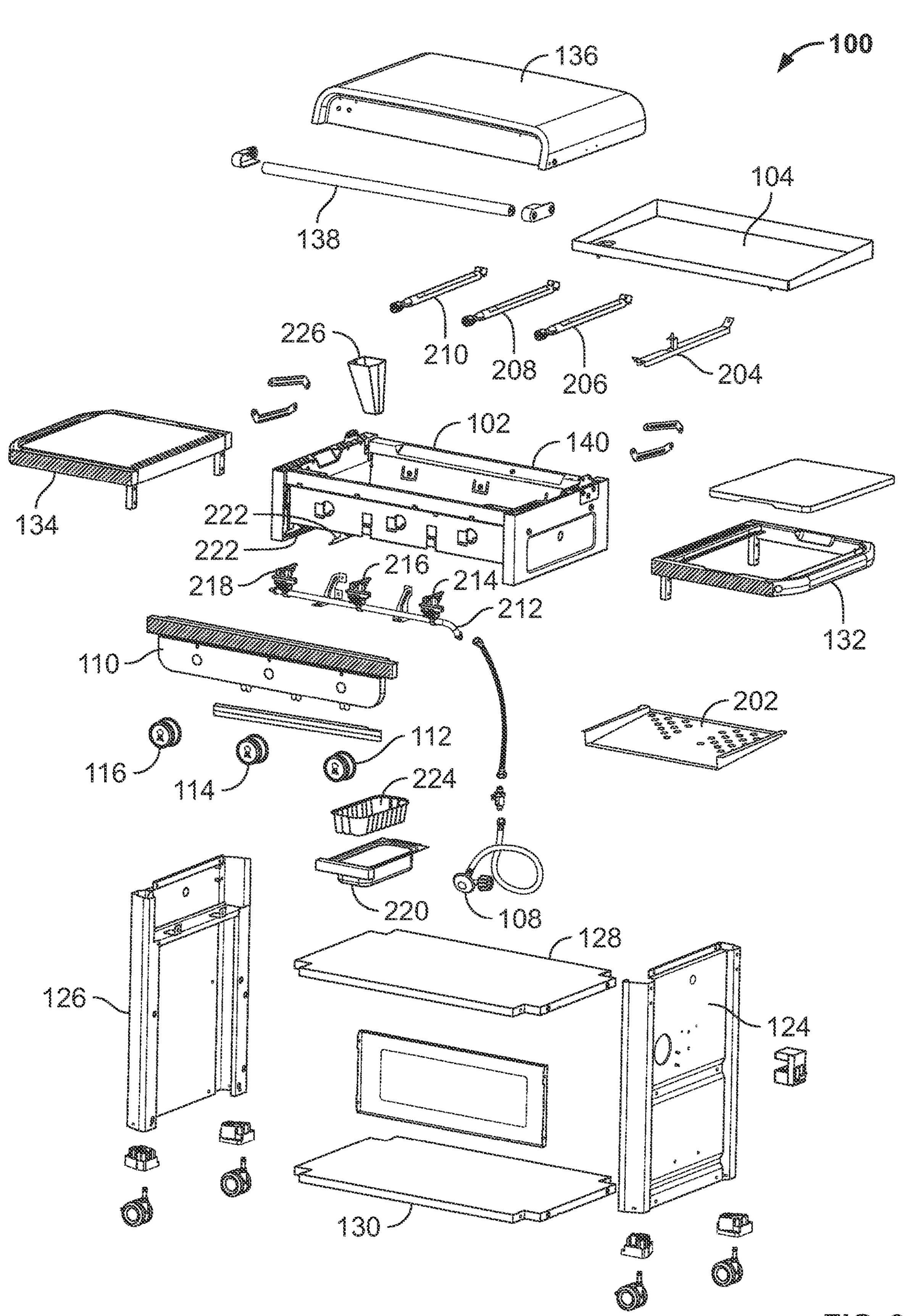
FIG. 2 is an exploded view of the grill of FIG. 1.

FIG. 1 is a perspective view of an example grill 100 constructed in accordance with the teachings of this disclosure. FIG. 2 is an exploded view of the grill 100 of FIG. 1. The grill 100 of FIGS. 1 and 2 is structured as a flat top gas grill. In this regard, the grill 100 of FIGS. 1 and 2 includes an example cookbox 102, an example heat shield 202, an example temperature sensor assembly 204, and an example griddle 104. The heat shield 202 of the grill 100 is configured to be disposed on and/or below a bottom wall of the cookbox 102 of the grill 100. The temperature sensor assembly 204 of the grill 100 is configured to be disposed on and/or within the cookbox 102 of the grill 100 such that a sensing portion of a temperature probe of the temperature sensor assembly is oriented upward. The griddle 104 of the grill 100 is configured to be disposed on and/or above the cookbox 102 of the grill 100 such that an underside of the griddle contacts and/or is adjacent the sensing portion of the temperature probe of the temperature sensor assembly 204 of the grill 100. The cookbox 102 of the grill 100 is further described below in connection with FIGS. 3, 4, 11, and 12. The heat shield 202 of the grill 100 is further described below in connection with FIGS. 5, 6, 11, and 12. The temperature sensor assembly 204 of the grill is further described below in connection with FIGS. 7-12. The griddle 104 of the grill 100 is further described below in connection with FIGS. 13 and 14.

The grill 100 of FIGS. 1 and 2 further includes a plurality of burner tubes configured to be disposed within the cookbox 102 at a location between a bottom wall of the cookbox 102 and an upper rim defined by or associated with the cookbox 102, and/or at a location between the bottom wall of the cookbox 102 and an underside of the griddle 104. As shown in FIG. 2, the plurality of burner tubes includes an example first burner tube 206, an example second burner tube 208, and an example third burner tube 210 (e.g., a total of three burner tubes) configured to be laterally spaced apart from one another and arranged in a front-to-rear orientation within the cookbox 102, with the first burner tube 206, the second burner tube 208, and the third burner tube 210 being of a substantially identical construction relative to one another. In other examples, the plurality of burner tubes can instead include a different number (e.g., two, four, five, etc.) of burner tubes, and the construction of one or more of the burner tubes may differ from that of the first burner tube 206, the second burner tube 208, and/or the third burner tube 210 shown in FIG. 2. The first burner tube 206 of the grill 100 is further described below in connection with FIGS. 15-19.

In the illustrated example of FIGS. 1 and 2, the burner tubes (e.g., the first burner tube 206, the second burner tube 208, and the third burner tube 210) form part of a gas train that further includes an example fuel source 106, an example regulator assembly 108, an example manifold 212, and a plurality of control valves corresponding in number to the plurality of burner tubes. In this regard, the plurality of control valves of the grill 100 as shown in FIG. 2 includes an example first control valve 214 associated with the first burner tube 206, an example second control valve 216 associated with the second burner tube 208, and an example third control valve 218 associated with the third burner tube 210.

In the illustrated example of FIG. 1, the fuel source 106 is implemented as a fuel tank (e.g., a propane tank) containing combustible gas. In other examples, the fuel source 106 can instead be implemented as a piped (e.g., household) natural gas line that provides an accessible flow of combustible gas. The regulator assembly 108 is operatively positioned between the fuel source 106 and the manifold 212 such that a supply of combustible gas provided via the fuel source 106 flows through the regulator assembly 108 and into the manifold 212. The first control valve 214 is operatively positioned between the manifold 212 and the first burner tube 206 such that combustible gas received at the manifold 212 can be selectively supplied to the first burner tube 206 via the first control valve 214. The second control valve 216 is operatively positioned between the manifold 212 and the second burner tube 208 such that combustible gas received at the manifold 212 can be selectively supplied to the second burner tube 208 via the second control valve 216. The third control valve 218 is operatively positioned between the manifold 212 and the third burner tube 210 such that combustible gas received at the manifold 212 can be selectively supplied to the third burner tube 210 via the third control valve 218.

In the illustrated example of FIGS. 1 and 2, the manifold 212, the first control valve 214, the second control valve 216, and the third control valve 218 are at least partially covered and/or concealed by an example control panel 110 that is coupled to and/or located along the front of the cookbox 102. The grill 100 further includes a plurality of control knobs mounted and/or located along the front face of the control panel 110, with the plurality of control knobs corresponding in number to the plurality of control valves and/or the number of burner tubes. In this regard, the plurality of control valves of the grill 100 as shown in FIGS. 1 and 2 includes an example first control knob 112 associated with the first control valve 214 and/or the first burner tube 206, an example second control knob 114 associated with the second control valve 216 and/or the second burner tube 208, and an example third control knob 116 associated with the third control valve 218 and/or the third burner tube 210. Each control knob is mechanically coupled to its corresponding control valve such that movement (e.g., rotation) of the control knob changes the extent to which an adjustable flow control member of the corresponding control valve enables combustible gas to flow through the corresponding control valve into the corresponding burner tube. For example, the first control knob 112 is mechanically coupled to the first control valve 214 such that movement (e.g., rotation) of the first control knob 112 changes the extent to which an adjustable flow control member of the first control valve 214 enables combustible gas to flow through the first control valve 214 into the first burner tube 206.

The grill 100 of FIGS. 1 and 2 further includes an example waste collection assembly 118 configured to collect and facilitate the removal of cooking waste. In the illustrated example of FIGS. 1 and 2, the waste collection assembly 118 includes an example waste bin 220 that is suspended from and slidably coupled to a pair of example support rails 222, with the support rails 222 being coupled to an underside of the cookbox 102. The waste bin 220 is moveable (e.g., slidable) along the support rails 222 between a closed position in which a substantial portion of the waste bin 220 is covered by the underside of the cookbox 102 (e.g., as shown in FIG. 1), and an open position in which a substantial portion of the waste bin 220 is located forward of and not covered by the underside of the cookbox 102. The waste bin 220 is configured to hold and/or contain an example disposable liner 224.

When the waste bin 220 is in the closed position, the waste bin 220 and/or the disposable liner 224 is/are positioned below a lower waste disposal opening formed in and extending through a bottom wall of the cookbox 102. The waste collection assembly 118 further includes an example waste disposal chute 226 disposed within the cookbox 102, and an example upper waste disposal opening 120 formed in and extending through the griddle 104. The waste disposal chute 226 is operatively positioned between the upper waste disposal opening 120 and the lower waste disposal opening such that liquid and/or solid cooking waste (e.g., grease, residue, particles, and/or other byproducts associated with a cooking operation) located on a flat top cooking surface of the griddle 104 can be fed into the upper waste disposal opening 120, with the cooking waste thereafter passing from the upper waste disposal opening 120 through the waste disposal chute 226 and through the lower waste disposal opening. The waste bin 220 and/or the disposable liner 224 collect(s) cooking waste that passes though the waste disposal chute 226 and the lower waste disposal opening when the waste bin 220 is in the closed position. Moving the waste bin 220 from the closed position into the open position facilitates removal of the disposable liner 224 and/or the cooking waste contained therein.

The grill 100 of FIGS. 1 and 2 further includes an example frame 122. The frame 122 can be configured from any number and any type of structural components arranged in any manner that facilitates supporting the cookbox 102 above an underlying ground surface when the grill 100 is in use. In the illustrated example of FIGS. 1 and 2, the frame 122 includes an example right side support panel 124 and an example left side support panel 126, each of which is configured to support the cookbox 102. As shown in FIGS. 1 and 2, the right side support panel 124 and the left side support panel 126 are spaced apart from one another, are oriented vertically, and are coupled (e.g., via one or more fastener(s)) to the cookbox 102 in a fixed manner. The frame 122 further includes an example upper shelf 128 and an example lower shelf 130, each of which is configured to support one or more item(s) at a location below the cookbox 102 of the grill 100. As shown in FIGS. 1 and 2, the upper shelf 128 and the lower shelf 130 are spaced apart from one another, are oriented horizontally, and are coupled (e.g., via one or more fastener(s)) to the right side support panel 124 and/or the left side support panel 126 in a fixed manner. In other examples, the frame 122 can instead include one or more foldable, slidable, and/or telescoping support member (s) (e.g., leg(s), panel(s), etc.) that facilitate collapsing and/or otherwise modifying the frame 122 of the grill 100 when the grill 100 is not in use.

The grill 100 of FIGS. 1 and 2 further includes an example right side accessory support frame 132 and an example left side accessory support frame 134. The right side accessory support frame 132 is coupled (e.g., via one or more fastener (s)) to the right side support panel 124 of the frame 122, and/or to a right sidewall of the cookbox 102. Conversely, the left side accessory support frame 134 is coupled (e.g., via one or more fastener(s)) to the left side support panel 126 of the frame 122, and/or to a left sidewall of the cookbox 102. The right side accessory support frame 132 and the left side accessory support frame 134 of the grill 100 are respectively configured to support one or more insertable accessories and/or one or more snap fit accessories at a location to the side (e.g., the right side or the left side) of the cookbox 102 of the grill 100.

The grill 100 of FIGS. 1 and 2 further includes an example lid 136 configured to cover and/or enclose the griddle 104 of the grill 100 when the lid 136 is in a closed position. The lid 136 is movable relative to the cookbox 102, the griddle 104, and/or the frame 122 of the grill 100 between a closed position in which the flat top cooking surface of the griddle 104 is covered, and an open position in which the flat top cooking surface of the griddle 104 is exposed (e.g., as shown in FIG. 1). In the illustrated example of FIGS. 1 and 2, the lid 136 is pivotally coupled to the cookbox 102 and/or the frame 122 of the grill 100 via one or more hinge(s). In other examples, the lid 136 can instead be removably positioned on the cookbox 102, the griddle 104, and/or the frame 122 of the grill 100 without there being any direct mechanical coupling between the lid 136 on the one hand and the cookbox 102, the griddle 104, and/or the frame 122 on the other hand. Movement of the lid 136 of the grill 100 between the closed position and the open position can be facilitated via user interaction with an example handle 138 that is coupled (e.g., via one or more fastener(s)) to the lid 136.

Figure 3:
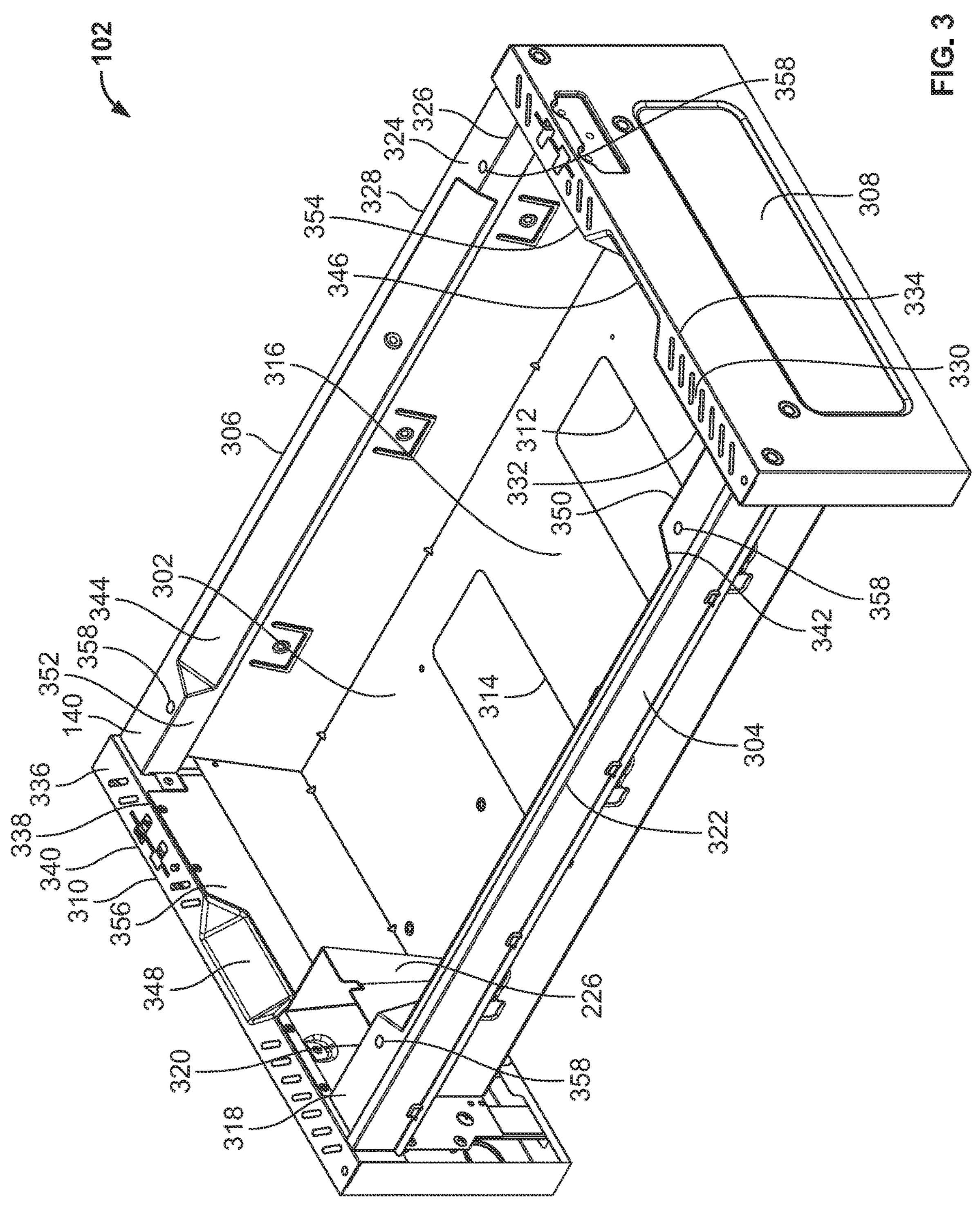
FIG. 3 is a perspective view showing the cookbox of the grill of FIGS. 1 and 2 in isolation.
Figure 4:
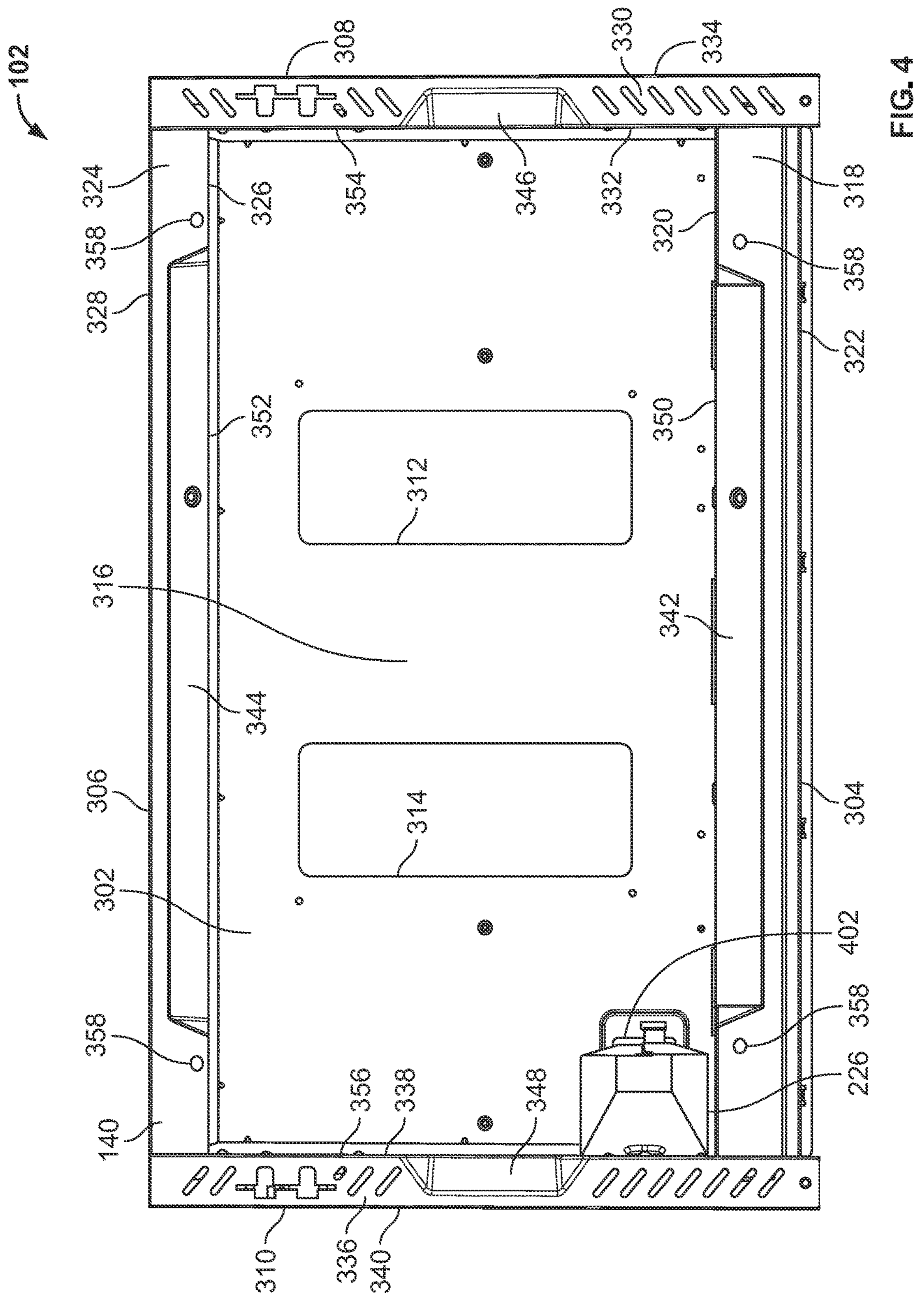
FIG. 4 is a top view of the cookbox of FIG. 3.

FIG. 3 is a perspective view showing the cookbox 102 of the grill 100 of FIGS. 1 and 2 in isolation. FIG. 4 is a top view of the cookbox 102 of FIG. 3. As shown in FIGS. 3 and 4, the cookbox 102 includes an example bottom wall 302, an example front wall 304, an example rear wall 306, an example right sidewall 308, and an example left sidewall 310. The rear wall 306 of the cookbox 102 is located opposite the front wall 304 of the cookbox 102. The right sidewall 308 of the cookbox 102 extends between the front wall 304 and the rear wall 306 of the cookbox 102. The left sidewall 310 of the cookbox 102 is located opposite the right sidewall 308 of the cookbox 102 and extends between the front wall 304 and the rear wall 306 of the cookbox 102. As shown in FIGS. 3 and 4, the front wall 304, the rear wall 306, the right sidewall 308, and the left sidewall 310 of the cookbox 102 extend upwardly from the bottom wall 302 of the cookbox 102 to define a cavity in which one or more structural component(s) (e.g., the first burner tube 206, the second burner tube 208, and the third burner tube 210) of the grill 100 can be disposed.

The cookbox 102 further includes a plurality of air intake openings formed in and extending through the bottom wall 302 of the cookbox 102. The air intake openings are individually and collectively configured to draw air from the surrounding atmosphere into the cookbox 102. As shown in FIGS. 3 and 4, the plurality of air intake openings includes an example first air intake opening 312 and an example second air intake opening 314, with the second air intake opening 314 being laterally spaced apart from the first air intake opening 312. In this regard, the bottom wall 302 of the cookbox 102 further includes an example solid portion 316 that extends between the front wall 304 and the rear wall 306 of the cookbox 102, and further extends between the first air intake opening 312 and the second air intake opening 314 formed in the bottom wall 302 of the cookbox 102. In the illustrated example of FIGS. 3 and 4, the solid portion 316 is free of any unplugged and/or uncovered opening(s) that extend through the bottom wall 302.

The first air intake opening 312, the second air intake opening 314, and the solid portion 316 of the bottom wall 302 of the cookbox 102 are individually and collectively configured such that a burner tube (e.g., the second burner tube 208) of the grill 100 is laterally aligned with the solid portion 316, and such that said burner tube (e.g., the second burner tube 208) is laterally positioned between the first air intake opening 312 and the second air intake opening 314. The first air intake opening 312, the second air intake opening 314, and the solid portion 316 of the bottom wall 302 of the cookbox 102 are further individually and collectively configured such that the first air intake opening 312 is laterally positioned between one set of neighboring burner tubes (e.g., the first burner tube 206 and the second burner tube 208) of the grill 100, and such that the second air intake opening 314 is laterally positioned between another set of neighboring burner tubes (e.g., the second burner tube 208 and the third burner tube 210) of the grill 100.

In the illustrated example of FIGS. 3 and 4, the plurality of air intake openings includes a total of two air intake openings (e.g., the first air intake opening 312 and the second air intake opening 314). In other examples, the plurality of air intake openings can instead include a different number (e.g., three, four, five, etc.) of air intake openings. In the illustrated example of FIGS. 3 and 4, the first air intake opening 312 and the second air intake opening 314 each have a rectangular shape. In other examples, the first air intake opening 312 and/or the second air intake opening 314 can instead have a different shape (e.g., a circular shape, an oval shape, a triangular shape, a trapezoidal shape, etc.).

In addition to the air intake openings illustrated in FIGS. 3 and 4, the cookbox 102 further includes an example lower waste disposal opening 402 formed in and extending through the bottom wall 302 of the cookbox 102. The lower waste disposal opening 402 is configured to receive and/or to otherwise be in alignment with a lower portion of the waste disposal chute 226 of the waste collection assembly 118 of the grill 100. Unlike the air intake openings described above, the lower waste disposal opening 402 is not configured to draw air from the surrounding atmosphere into the cookbox 102, but is instead configured to transport cooking waste passing through the waste disposal chute 226 into the disposable liner 224 and/or the waste bin 220 of the waste collection assembly 118 of the grill 100, as further described above.

In the illustrated example of FIGS. 3 and 4, the bottom wall 302 of the cookbox 102 has a width (e.g., measured between the right sidewall 308 and the left sidewall 310) of approximately 30.1 inches, a depth (e.g., measured between the front wall 304 and the rear wall 306) of approximately 14.9 inches, and an associated total area (e.g., calculated as width multiplied by depth) of approximately 448.5 square inches. The first air intake opening 312 formed in the bottom wall 302 has an area of approximately 40.5 square inches, and the second air intake opening 314 formed in the bottom wall 302 has an area of approximately 40.5 square inches. Thus, the first air intake opening 312 and the second air intake opening 314 collectively define an unoccupied area of 81.0 square inches. In the illustrated example of FIGS. 3 and 4, the unoccupied area defined by the air intake openings accounts for approximately 18.1 percent of the total area of the bottom wall 302. In other examples, the unoccupied area defined by the air intake openings can account for between 10.0 and 30.0 percent of the total area of the bottom wall 302. Satisfaction of the above-described range of the ratio of unoccupied area defined by the air intake openings to the total area of the bottom wall 302 advantageously improves the operating efficiency of the cooking engine of the grill 100, and also improves the heat distribution properties associated with the griddle 104 of the grill 100. In this regard, satisfaction of the above-described range of the ratio of unoccupied area defined by the air intake openings to the total area of the bottom wall 302 advantageously assists in minimizing any temperature variation across the flat top cooking surface of the griddle 104 during cooking operations performed thereon.

The grill 100 of FIGS. 1 and 2 further includes an example upper rim 140 defined by or associated with the cookbox 102. In the illustrated example of FIGS. 1-4, the upper rim 140 is formed by one or more portion(s) of the front wall 304, the rear wall 306, the right sidewall 308, and/or the left sidewall 310 of the cookbox 102. In other examples, one or more portion(s) of the upper rim 140 can additionally or alternatively be formed by one or more portion(s) of the control panel 110 and/or the frame 122 of the grill 100. As shown in FIGS. 3 and 4, the front wall 304, the rear wall 306, the right sidewall 308, and the left sidewall 310 of the cookbox 102 each include an upper surface having an inner edge and an outer edge. More specifically, the front wall 304 includes an example upper surface 318 having an example inner edge 320 and an example outer edge 322, the rear wall 306 includes an example upper surface 324 having an example inner edge 326 and an example outer edge 328, the right sidewall 308 includes an example upper surface 330 having an example inner edge 332 and an example outer edge 334, and the left sidewall 310 includes an example upper surface 336 having an example inner edge 338 and an example outer edge 340. The aforementioned upper surfaces (318, 324, 330, 336), inner edges (320, 326, 332, 338), and outer edges (322, 328, 334, 340) of the front wall 304, the rear wall 306, the right sidewall 308, and the left sidewall 310 form and/or define the upper rim 140 of the cookbox 102.

In the illustrated example of FIGS. 1-4, the upper surface 324 of the rear wall 306, the upper surface 330 of the right sidewall 308, and the upper surface 336 of the left sidewall 310 are respectively planar and/or flat. The upper surface 318 of the front wall 304 includes a stepped portion that divides the upper surface 318 of the front wall 304 into a raised portion and a lowered portion, each of which is planar and/or flat. In other examples, the upper surface 318 of the front wall 304 (e.g., including the raised portion and/or the lowered portion thereof), the upper surface 324 of the rear wall 306, the upper surface 330 of the right sidewall 308, and/or the upper surface 336 of the left sidewall 310 can instead be curved and/or contoured.

The cookbox 102 of the grill 100 further includes one or more recess(es) formed along the upper rim 140 of the cookbox 102, with each recess being configured to vent heated air generated within the cookbox 102 (e.g., heated air generated via the first burner tube 206, the second burner tube 208, and/or the third burner tube 210). In the illustrated example of FIGS. 1-4, the upper rim 140 of the cookbox 102 includes an example first recess 342 formed in the front wall 304 of the cookbox 102, an example second recess 344 formed in the rear wall 306 of the cookbox 102, an example third recess 346 formed in the right sidewall 308 of the cookbox 102, and an example fourth recess 348 formed in the left sidewall 310 of the cookbox 102. In other examples, the upper rim 140 of the cookbox 102 can instead include a different number (e.g., 1, 2, 3, 5, 6, etc.) of recesses. While the illustrated example of FIGS. 1-4 depicts the upper rim 140 of the cookbox 102 as having a total of four recesses including a single recess formed in each one of the front wall 304, the rear wall 306, the right sidewall 308, and the left sidewall 310 of the cookbox 102, in other examples the upper rim 140 of the cookbox 102 can include multiple recesses formed in each one of the front wall 304, the rear wall 306, the right sidewall 308, and the left sidewall 310 of the cookbox 102. In still other examples, the upper rim 140 of the cookbox 102 can include one or more recesses formed in specific ones of the front wall 304, the rear wall 306, the right sidewall 308, and/or the left sidewall 310 of the cookbox 102 while lacking any recesses formed in other ones of the front wall 304, the rear wall 306, the right sidewall 308, and/or the left sidewall 310 of the cookbox 102.

In the illustrated example of FIGS. 1-4, the first recess 342 of the upper rim 140 of the cookbox 102 is formed along the inner edge 320 of the upper surface 318 of the front wall 304. The first recess 342 extends and/or is located between the upper surface 318 of the front wall 304 and an example inner surface 350 of the front wall 304 such that the first recess 342 forms an angled wall segment that tapers outwardly (e.g., toward the outer edge 322 of the upper surface 318 of the front wall 304) moving in an upward direction along the inner surface 350 of the front wall 304 toward and/or to the upper surface 318 of the front wall 304 and/or the inner edge 320 thereof. The inner edge 320 of the upper surface 318 of the front wall 304 accordingly steps and/or extends outwardly (e.g., toward the outer edge 322 of the upper surface 318 of the front wall 304) at the location of the first recess 342. The first recess 342 is configured to vent heated air generated within the cookbox 102 (e.g., heated air generated via the first burner tube 206, the second burner tube 208, and/or the third burner tube 210), with such venting occurring along the front wall 304 of the cookbox 102 at the location of the first recess 342.

The second recess 344 of the upper rim 140 of the cookbox 102 is formed along the inner edge 326 of the upper surface 324 of the rear wall 306 at a location opposite the first recess 342. The second recess 344 extends and/or is located between the upper surface 324 of the rear wall 306 and an example inner surface 352 of the rear wall 306 such that the second recess 344 forms an angled wall segment that tapers outwardly (e.g., toward the outer edge 328 of the upper surface 324 of the rear wall 306) moving in an upward direction along the inner surface 352 of the rear wall 306 toward and/or to the upper surface 324 of the rear wall 306 and/or the inner edge 326 thereof. The inner edge 326 of the upper surface 324 of the rear wall 306 accordingly steps and/or extends outwardly (e.g., toward the outer edge 328 of the upper surface 324 of the rear wall 306) at the location of the second recess 344. The second recess 344 is configured to vent heated air generated within the cookbox 102 (e.g., heated air generated via the first burner tube 206, the second burner tube 208, and/or the third burner tube 210), with such venting occurring along the rear wall 306 of the cookbox 102 at the location of the second recess 344.

The third recess 346 of the upper rim 140 of the cookbox 102 is formed along the inner edge 332 of the upper surface 330 of the right sidewall 308. The third recess 346 extends and/or is located between the upper surface 330 of the right sidewall 308 and an example inner surface 354 of the right sidewall 308 such that the third recess 346 forms an angled wall segment that tapers outwardly (e.g., toward the outer edge 334 of the upper surface 330 of the right sidewall 308) moving in an upward direction along the inner surface 354 of the right sidewall 308 toward and/or to the upper surface 330 of the right sidewall 308 and/or the inner edge 332 thereof. The inner edge 332 of the upper surface 330 of the right sidewall 308 accordingly steps and/or extends outwardly (e.g., toward the outer edge 334 of the upper surface 330 of the right sidewall 308) at the location of the third recess 346. The third recess 346 is configured to vent heated air generated within the cookbox 102 (e.g., heated air generated via the first burner tube 206, the second burner tube 208, and/or the third burner tube 210), with such venting occurring along the right sidewall 308 of the cookbox 102 at the location of the third recess 346. The third recess 346 is further configured to advantageously provide a clearance opening sized to receive at least a portion of a hand (e.g., one or more fingers of a right hand) of a user in connection with the user manually installing the griddle 104 on, and/or manually removing the griddle 104 from, the cookbox 102 of the grill 100.

The fourth recess 348 of the upper rim 140 of the cookbox 102 is formed along the inner edge 338 of the upper surface 336 of the left sidewall 310 at a location opposite the third recess 346. The fourth recess 348 extends and/or is located between the upper surface 336 of the left sidewall 310 and an example inner surface 356 of the left sidewall 310 such that the fourth recess 348 forms an angled wall segment that tapers outwardly (e.g., toward the outer edge 340 of the upper surface 336 of the left sidewall 310) moving in an upward direction along the inner surface 356 of the left sidewall 310 toward and/or to the upper surface 336 of the left sidewall 310 and/or the inner edge 338 thereof. The inner edge 338 of the upper surface 336 of the left sidewall 310 accordingly steps and/or extends outwardly (e.g., toward the outer edge 340 of the upper surface 336 of the left sidewall 310) at the location of the fourth recess 348. The fourth recess 348 is configured to vent heated air generated within the cookbox 102 (e.g., heated air generated via the first burner tube 206, the second burner tube 208, and/or the third burner tube 210), with such venting occurring along the left sidewall 310 of the cookbox 102 at the location of the fourth recess 348. The fourth recess 348 is further configured to advantageously provide a clearance opening sized to receive at least a portion of a hand (e.g., one or more fingers of a left hand) of a user in connection with the user manually installing the griddle 104 on, and/or manually removing the griddle 104 from, the cookbox 102 of the grill 100.

The cookbox 102 of the grill 100 further includes a plurality of example griddle docking openings 358 configured to receive and/or to otherwise engage corresponding ones of a plurality of griddle support members of the griddle 104. In the illustrated example of FIGS. 1-4, the griddle docking openings 358 are formed in the upper rim 140 of the cookbox 102. For example, as shown in FIGS. 3 and 4, the cookbox 102 includes two griddle docking openings 358 formed in and/or extending through the upper surface 318 of the front wall 304 of the cookbox 102, and two griddle docking openings 358 formed in and/or extending through the upper surface 324 of the rear wall 306 of the cookbox 102, wherein the upper surface 318 of the front wall 304 and the upper surface 324 of the rear wall 306 form portions of the upper rim 140 of the cookbox 102. In other examples, one or more griddle docking opening(s) 358 can additionally or alternatively be formed in the upper surface 330 of the right sidewall 308 and/or the upper surface 336 of the left sidewall 310 of the cookbox 102. As further described below, the griddle docking openings 358 and the griddle support members are configured to support the griddle 104 of the grill 100 on or above the cookbox 102 of the grill 100, and/or on, above, or at one or more portion(s) of the upper rim 140 of the cookbox 102 of the grill 100.

Figure 5:
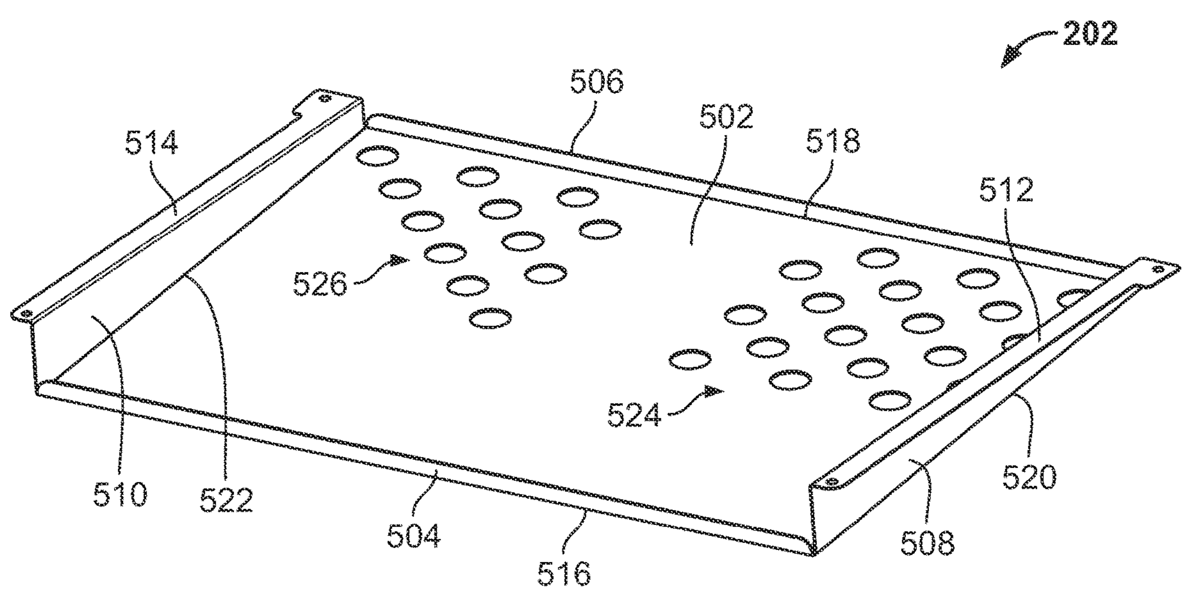
FIG. 5 is a first perspective view showing the heat shield of the grill of FIGS. 1 and 2 in isolation.
Figure 6:
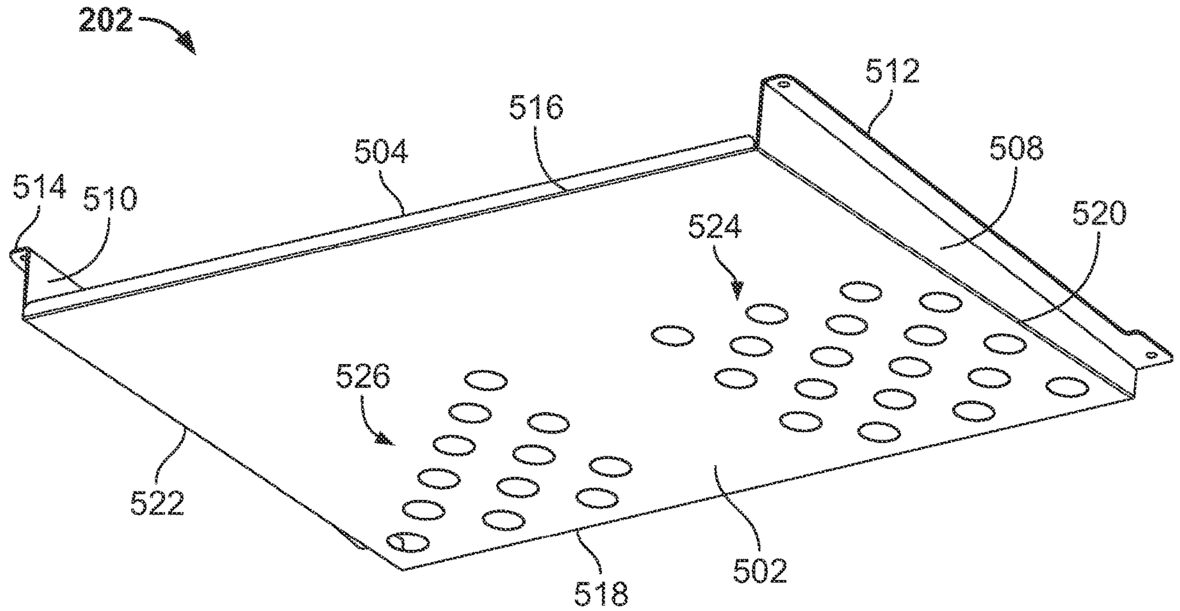
FIG. 6 is a second perspective view of the heat shield of FIG. 5.

FIG. 5 is a first perspective view showing the heat shield 202 of the grill 100 of FIGS. 1 and 2 in isolation. FIG. 6 is a second perspective view of the heat shield 202 of FIG. 5. In the illustrated example of FIGS. 5 and 6, the heat shield 202 includes an example panel 502, an example front lip 504, an example rear lip 506, an example right side lip 508, an example left side lip 510, an example first mounting flange 512, and an example second mounting flange 514. The panel 502 of the heat shield 202 includes an example front edge 516, an example rear edge 518, an example right side edge 520, and an example left side edge 522. In the illustrated example of FIGS. 5 and 6, the panel 502 of the heat shield 202 is planar and/or flat. In other examples, the panel 502 of the heat shield 202 can instead be contoured and/or curved. In the illustrated example of FIGS. 5 and 6, the panel 502 of the heat shield 202 has a rectangular shape. In other examples, the panel 502 of the heat shield 202 can instead have a non-rectangular shape (e.g., a circular shape, an oval shape, a triangular shape, a trapezoidal shape, etc.).

The heat shield 202 is configured such that the panel 502 of the heat shield 202 is spaced apart from and located below the bottom wall 302 of the cookbox 102 when the heat shield 202 is coupled to the cookbox 102, with the panel 502 of the heat shield 202 extending across the first air intake opening 312 and/or the second air intake opening 314 formed in the bottom wall 302 of the cookbox 102. In the illustrated example of FIGS. 5 and 6, the heat shield 202 further includes openings formed in and/or extending through the panel 502 of the heat shield 202. More specifically, the heat shield includes an example first plurality of openings 524 and an example second plurality of openings 526 formed in and/or extending though the panel 502 of the heat shield 202, with the first plurality of openings 524 and the second plurality of openings 526 being laterally spaced apart from one another along the panel 502 of the heat shield 202. The heat shield 202 is further configured such that, when the heat shield 202 is coupled to the cookbox 102, one or more first opening(s) from among the first plurality of openings 524 is/are laterally aligned with the first air intake opening 312, and one or more second opening(s) from among the second plurality of openings 526 is/are laterally aligned with the second air intake opening 314. In this regard, respective ones of the first plurality of openings 524 and/or the second plurality of openings 526 formed in the panel 502 of the heat shield 202 are configured to have a size (e.g., a length, a width, a diameter, etc.) that is significantly less than the size of the first air intake opening 312 and/or the size of the second air intake opening 314 formed in the bottom wall 302 of the cookbox 102.

In the illustrated example of FIGS. 5 and 6, the front lip 504, the rear lip 506, the right side lip 508, and the left side lip 510 of the heat shield 202 are coupled to (e.g., integrally formed with) the panel 502 of the heat shield 202, and extends upwardly therefrom. More specifically, the front lip 504 of the heat shield 202 is coupled to (e.g., integrally formed with) the panel 502 of the heat shield 202, with the front lip 504 extending upwardly from the front edge 516 of the panel 502. The rear lip 506 of the heat shield 202 is coupled to (e.g., integrally formed with) the panel 502 of the heat shield 202, with the rear lip 506 extending upwardly from the rear edge 518 of the panel 502. The right side lip 508 of the heat shield 202 is coupled to (e.g., integrally formed with) the panel 502 of the heat shield 202, with the right side lip 508 extending upwardly from the right side edge 520 of the panel 502. The left side lip 510 of the heat shield 202 is coupled to (e.g., integrally formed with) the panel 502 of the heat shield 202, with the left side lip 510 extending upwardly from the left side edge 522 of the panel 502.

In the illustrated example of FIGS. 5 and 6, the first mounting flange 512 and the second mounting flange 514 of the heat shield 202 are respectively coupled to (e.g., integrally formed with) corresponding ones of the right side lip 508 and the left side lip 510 of the heat shield 202. More specifically, the first mounting flange 512 of the heat shield 202 is coupled to (e.g., integrally formed with) the right side lip 508 of the heat shield 202, with the first mounting flange 512 being configured to couple (e.g., via one or more fastener(s)) the heat shield 202 to the bottom wall 302 of the cookbox 102. The second mounting flange 514 of the heat shield 202 is coupled to (e.g., integrally formed with) the left side lip 510 of the heat shield 202, with the second mounting flange 514 being configured to couple (e.g., via one or more fastener(s)) the heat shield 202 to the bottom wall 302 of the cookbox 102.

As discussed above, the burners of the grill 100 (e.g., the first burner tube 206, the second burner tube 208, and/or the third burner tube 210) generate heat within the cookbox 102 of the grill 100. Some of the generated heat is transferred to the bottom wall 302 of the cookbox 102. Some of the generated heat escapes the cookbox 102 via the first air intake opening 312 and/or the second air intake opening 314 formed in the bottom wall 302 of the cookbox 102. The heat shield 202 and, more specifically, the panel 502 of the heat shield 202, is configured to reflect heat. For example, when the heat shield 202 is coupled to the cookbox 102 (e.g., to the bottom wall 302 of the cookbox 102), the panel 502 of the heat shield 202 is spaced apart from and located below the bottom wall 302 of the cookbox 102, with the panel 502 extending across the first air intake opening 312 and/or the second air intake opening 314 formed in the bottom wall 302 of the cookbox 102. When so positioned, the panel 502 of the heat shield 202 receives heat from the bottom wall 302 of the cookbox 102 and/or from the first air intake opening 312 and/or the second air intake opening 314 of the cookbox 102, and reflects the received heat upwardly back toward the bottom wall 302 of the cookbox 102, and/or back through the first air intake opening 312 and/or the second air intake opening 314 of the cookbox 102. Such reflection of heat advantageously lowers the ambient temperature of the volumetric space located below the bottom wall 302 of the cookbox 102 and below the panel 502 of the heat shield 202. The lowering of the ambient temperature in said volumetric space is beneficial, particularly in instances in which a storage shelf of the grill 100 (e.g., the upper shelf 128 of the grill 100 of FIGS. 1 and 2) is located in and/or proximate said volumetric space.

Figures 7, 8:
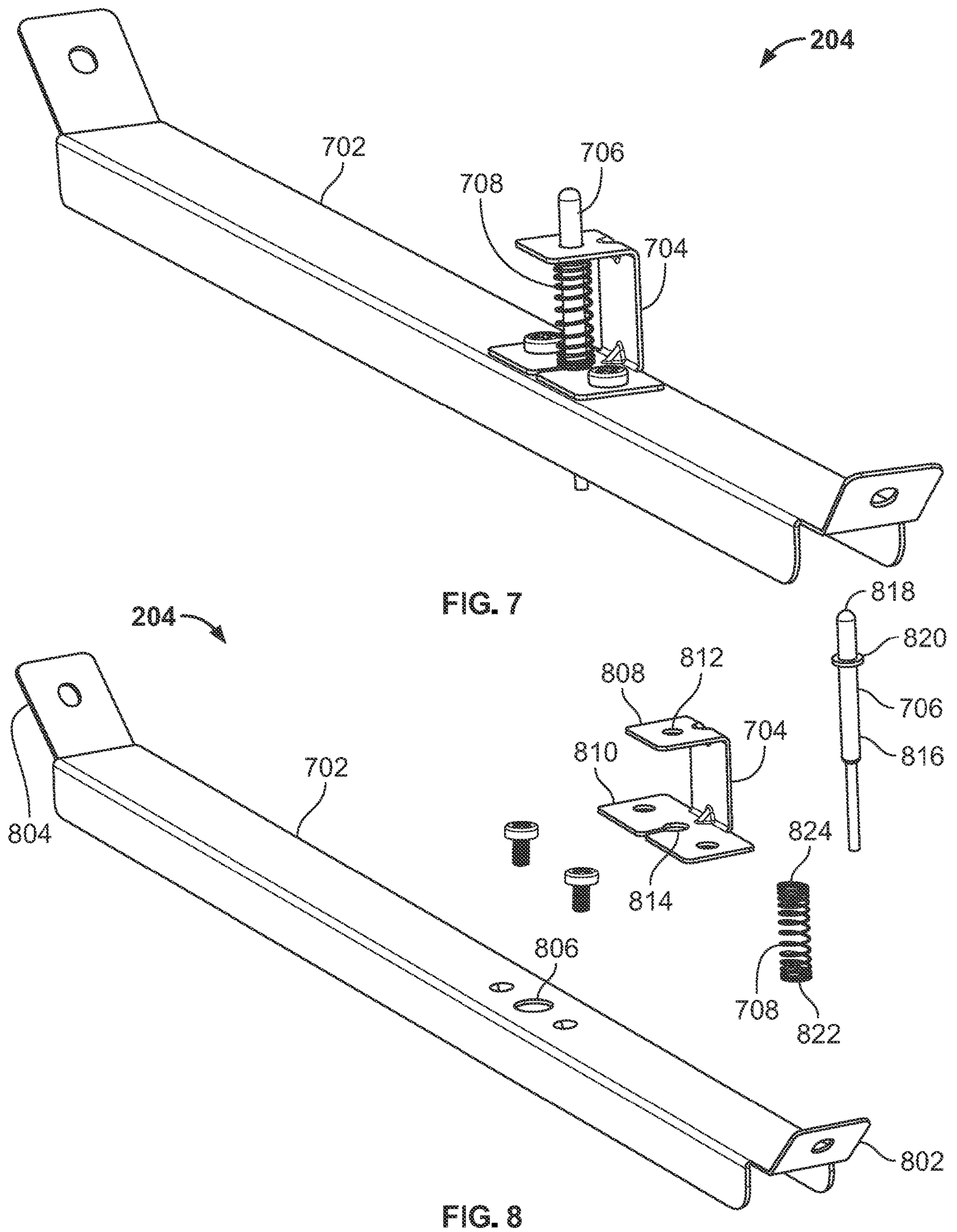
FIG. 7 is a perspective view showing the temperature sensor assembly of the grill of FIGS. 1 and 2 in isolation.
FIG. 8 is an exploded view of the temperature sensor assembly of FIG. 7.

FIG. 7 is a perspective view showing the temperature sensor assembly 204 of the grill 100 of FIGS. 1 and 2 in isolation. FIG. 8 is an exploded view of the temperature sensor assembly 204 of FIG. 7. In the illustrated example of FIGS. 7 and 8, the temperature sensor assembly 204 includes an example crossbar 702, an example mounting bracket 704, an example temperature probe 706, and an example spring 708. The crossbar 702 of the temperature sensor assembly 204 includes an example first end 802, an example second end 804 located opposite the first end 802, and an example opening 806 located between the first end 802 and the second end 804. The first end 802 and the second end 804 of the crossbar 702 are configured to be coupled (e.g., via one or more fastener(s)) to opposing structures of the cookbox 102 such that the crossbar 702 extends between the opposing structures. For example, the crossbar 702 of FIGS. 7 and 8 is configured such that the first end 802 of the crossbar 702 is couplable to the front wall 304 of the cookbox 102 and the second end 804 of the crossbar 702 is couplable to the rear wall 306 of the cookbox 102 such that the crossbar 702 extends between the front wall 304 and the rear wall 306. In other examples, the crossbar 702 can instead be configured such that the first end 802 of the crossbar 702 is couplable to the right sidewall 308 of the cookbox 102 and the second end 804 of the crossbar 702 is couplable to the left sidewall 310 of the cookbox 102 such that the crossbar 702 extends between the right sidewall 308 and the left sidewall 310. The opening 806 of the crossbar 702 is configured to slidingly receive a portion of the temperature probe 706 of the temperature sensor assembly 204, as further described herein.

The mounting bracket 704 of the temperature sensor assembly 204 is coupled (e.g., via one or more fastener(s)) to the crossbar 702 of the temperature sensor assembly 204. In the illustrated example of FIGS. 7 and 8, the mounting bracket 704 includes an example upper flange 808 and an example lower flange 810 spaced apart from the upper flange 808. The mounting bracket 704 further includes an example upper opening 812 formed in and/or extending through the upper flange 808, and an example lower opening 814 (e.g., a slotted opening) formed in and/or extending through the lower flange 810. The upper opening 812 of the upper flange 808 and the lower opening 814 of the lower flange 810 are respectively configured to slidingly receive one or more portion(s) of the temperature probe 706 of the temperature sensor assembly 204, as further described herein. In the illustrated example of FIGS. 7 and 8, the upper opening 812 of the upper flange 808, the lower opening 814 of the lower flange 810, and the opening 806 of the crossbar 702 are coaxially aligned with one another. Such an arrangement advantageously enables the temperature probe 706 of the temperature sensor assembly 204 to be movable (e.g., slidable) relative to the upper flange 808 of the mounting bracket 704 (e.g., via the upper opening 812), relative to the lower flange 810 of the mounting bracket 704 (e.g., via the lower opening 814), and relative to the crossbar 702 (e.g., via the opening 806).

The temperature probe 706 of the temperature sensor assembly 204 is configured to sense and/or detect a temperature of an object with which the temperature sensor is in contact. For example, the temperature probe 706 can sense and/or detect the temperature of the griddle 104 of the grill 100 of FIGS. 1 and 2 when the temperature probe 706 contacts a portion (e.g., an underside) of the griddle 104. In some examples, the temperature probe 706 can be implemented as a thermocouple. In the illustrated example of FIGS. 7 and 8, the temperature probe 706 includes an example shaft 816, an example sensing tip 818, and an example retention flange 820. The shaft 816 of the temperature probe 706 is configured to be slidingly received in the mounting bracket 704 of the temperature sensor assembly 204 (e.g., via the upper opening 812 of the upper flange 808 and via the lower opening 814 of the lower flange 810) and in the crossbar 702 of the temperature sensor assembly 204 (e.g., via the opening 806 of the crossbar 702). In the illustrated example of FIGS. 7 and 8, the shaft 816 of the temperature probe 706 has a circular cross-sectional shape, as do the upper opening 812 and the lower opening of the mounting bracket 704, as well as the opening 806 of the crossbar 702. In other examples, the shaft 816 of the temperature probe 706 can instead have a non-circular (e.g., rectangular, triangular, hexagonal, etc.) cross-sectional shape, as can the upper opening 812 and the lower opening of the mounting bracket 704, as well as the opening 806 of the crossbar 702.

The sensing tip 818 of the temperature probe 706 is located at an end of the shaft 816 of the temperature probe 706. The sensing tip 818 is configured to sense and/or detect a temperature of an object with which the sensing tip 818 is in contact. For example, the sensing tip 818 can sense and/or detect the temperature of the griddle 104 of the grill 100 of FIGS. 1 and 2 when the sensing tip 818 contacts a portion (e.g., an underside) of the griddle 104. The retention flange 820 of the temperature probe 706 is located along, and extends and/or projects outwardly from (e.g., radially away from), the shaft 816 of the temperature probe 706. When the temperature probe 706 is operatively positioned and/or coupled to the mounting bracket 704, the retention flange 820 of the temperature probe 706 is located between the upper flange 808 and the lower flange 810 of the mounting bracket 704. When so positioned, the retention flange 820 is configured to operate as a mechanical stop relative to the upper opening 812 formed in the upper flange 808 of the mounting bracket 704. In this regard, the outer edge of the retention flange 820 has a perimeter (e.g., a circumference) that is greater than the perimeter (e.g., the circumference) of the inner edge of the upper opening 812 of the upper flange 808. Upward movement of the shaft 816 and/or, more generally, of the temperature probe 706 relative to the mounting bracket 704 is accordingly limited and/or restricted by the retention flange 820 of the temperature probe 706.

The spring 708 of the temperature sensor assembly 204 is configured to bias the temperature probe 706 of the temperature sensor assembly 204 in an upward direction such that the retention flange 820 of the temperature probe 706 is biased toward and/or into contact with the upper flange 808 of the mounting bracket 704 of the temperature sensor assembly 204. In the illustrated example of FIGS. 7 and 8, the spring 708 includes an example first end 822 and an example second end 824 located opposite the first end 822. The first end 822 of the spring 708 contacts the lower flange 810 of the mounting bracket 704, and the second end 824 of the spring 708 contacts the retention flange 820 of the temperature probe 706. The spring 708 is accordingly operatively positioned between the lower flange 810 of the mounting bracket 704 and the retention flange 820 of the temperature probe 706 such that the spring 708 biases the retention flange 820 of the temperature probe 706 toward the upper flange 808 of the mounting bracket 704.

Figure 9:
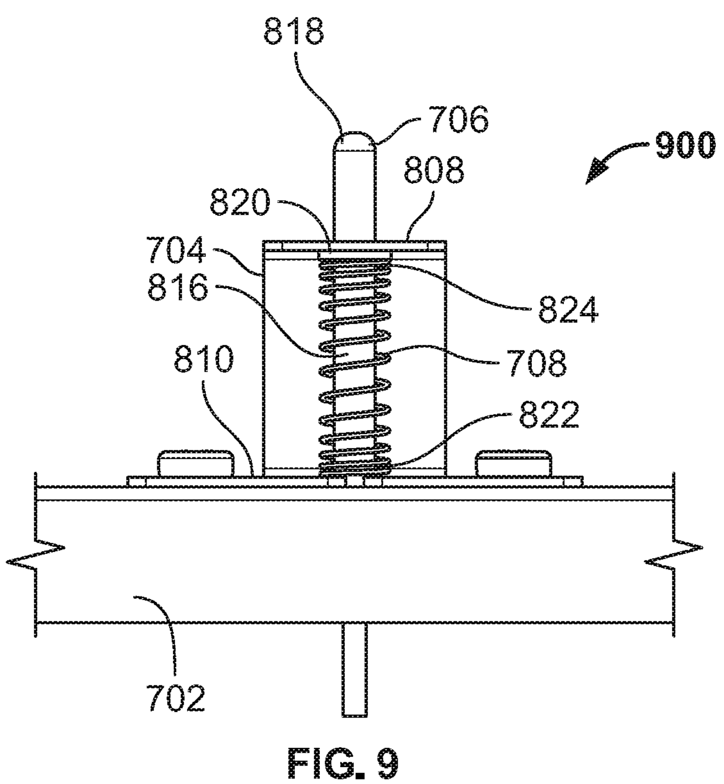
FIG. 9 is a side view of the temperature sensor assembly of FIGS. 7 and 8, with the temperature probe of the temperature sensor assembly shown in an example raised position.

The temperature probe 706 of the temperature sensor assembly 204 is movable (e.g., slidable) relative to the crossbar 702 and/or the mounting bracket 704 of the temperature sensor assembly 204. When the temperature sensor assembly 204 is coupled to the cookbox 102 of the grill 100, the temperature probe 706 is also movable (e.g., slidable) relative to the cookbox 102. Movement of the temperature probe 706 occurs between a raised position in which the retention flange 820 of the temperature probe 706 contacts or is adjacent to the upper flange 808 of the mounting bracket 704, and a lowered position in which the retention flange 820 of the temperature probe 706 is spaced apart from the upper flange 808 of the mounting bracket 704. For example, FIG. 9 is a side view of the temperature sensor assembly 204 of FIGS. 7 and 8, with the temperature probe 706 of the temperature sensor assembly 204 shown in an example raised position 900. As shown in FIG. 9, the spring 708 of the temperature sensor assembly 204 biases the retention flange 820 of the temperature probe 706 of the temperature sensor assembly 204 toward and/or into contact with the upper flange 808 of the mounting bracket 704 of the temperature sensor assembly 204. The spring 708 accordingly biases the temperature probe 706 into the raised position 900.

Figure 10:
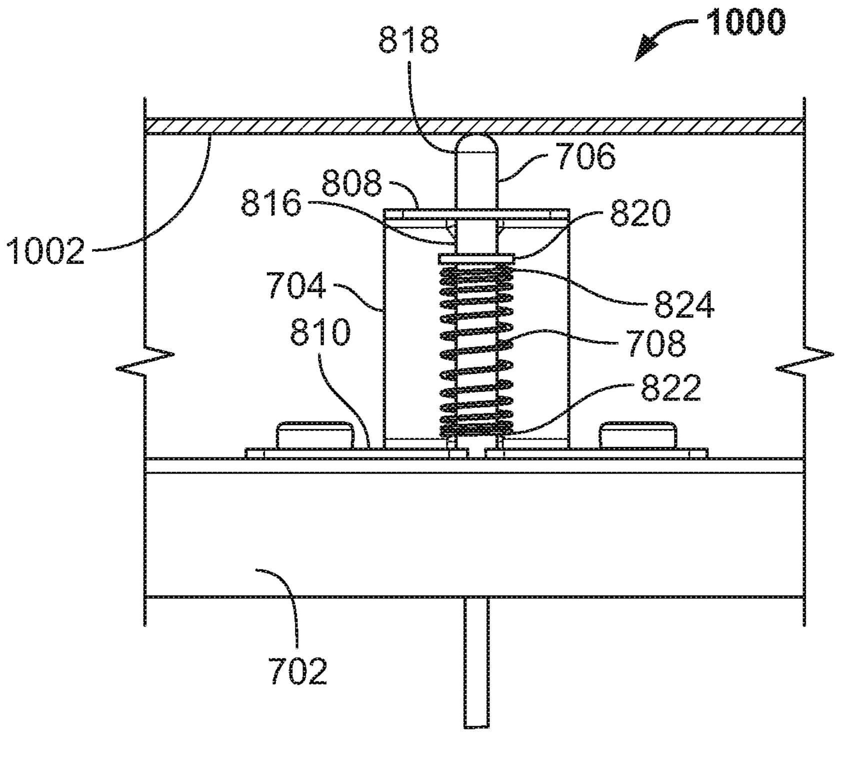
FIG. 10 is a side view of the temperature sensor assembly of FIGS. 7-9, with the temperature probe of the temperature sensor assembly shown in an example lowered position.

FIG. 10 is a side view of the temperature sensor assembly 204 of FIGS. 7-9, with the temperature probe 706 of the temperature sensor assembly 204 shown in an example lowered position 1000. As shown in FIG. 10, the sensing tip 818 of the temperature probe 706 contacts an example bottom surface 1002 of an object, which could be the underside of the griddle 104 as further described herein. In response to the bottom surface 1002 of the object contacting the sensing tip 818 of the temperature probe 706, the force associated with the weight of object overcomes (e.g., is greater than) the biasing force generated by the spring 708. The presence of the object accordingly causes the temperature probe 706 to move (e.g., slide) downwardly relative to the mounting bracket 704 such that the retention flange 820 of the temperature probe 706 becomes spaced apart from the upper flange 808 of the mounting bracket 704. So long as the bottom surface 1002 of the object contacts the sensing tip 818 of the temperature probe 706, the temperature probe 706 can accurately and reliably sense, measure, and/or detect the temperature of the bottom surface 1002 of the object. The resiliency and/or elasticity of the spring 708 advantageously ensures that the sensing tip 818 of the temperature probe 706 remains in contact with the bottom surface 1002 of the object, even in instances when the position of the bottom surface 1002 of the object has shifted and/or moved by a small amount.

Figure 11:
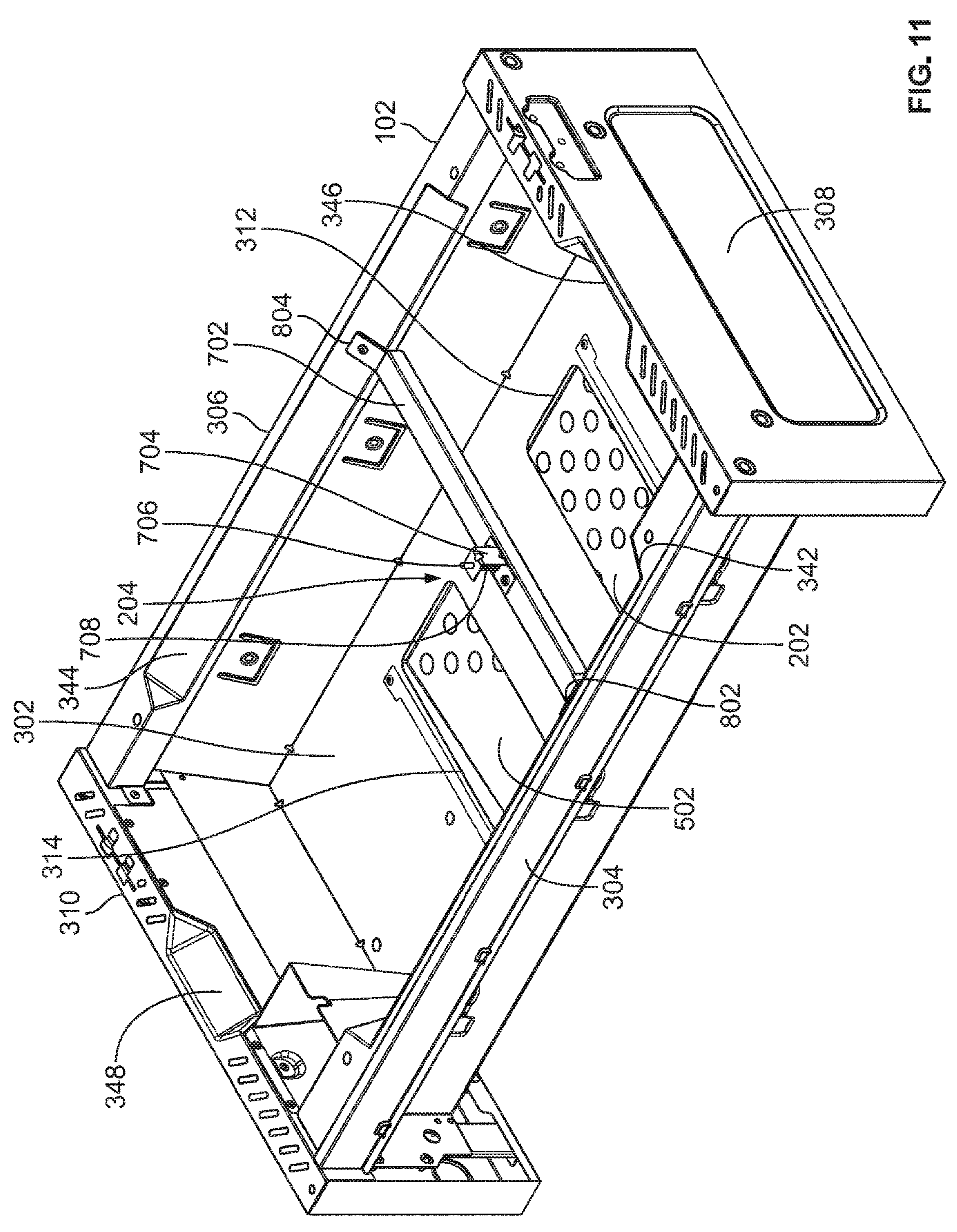
FIG. 11 is a perspective view of the cookbox of FIGS. 3 and 4 with the heat shield of FIGS. 5 and 6 and the temperature sensor assembly of FIGS. 7-10 shown coupled to the cookbox.
Figure 12:
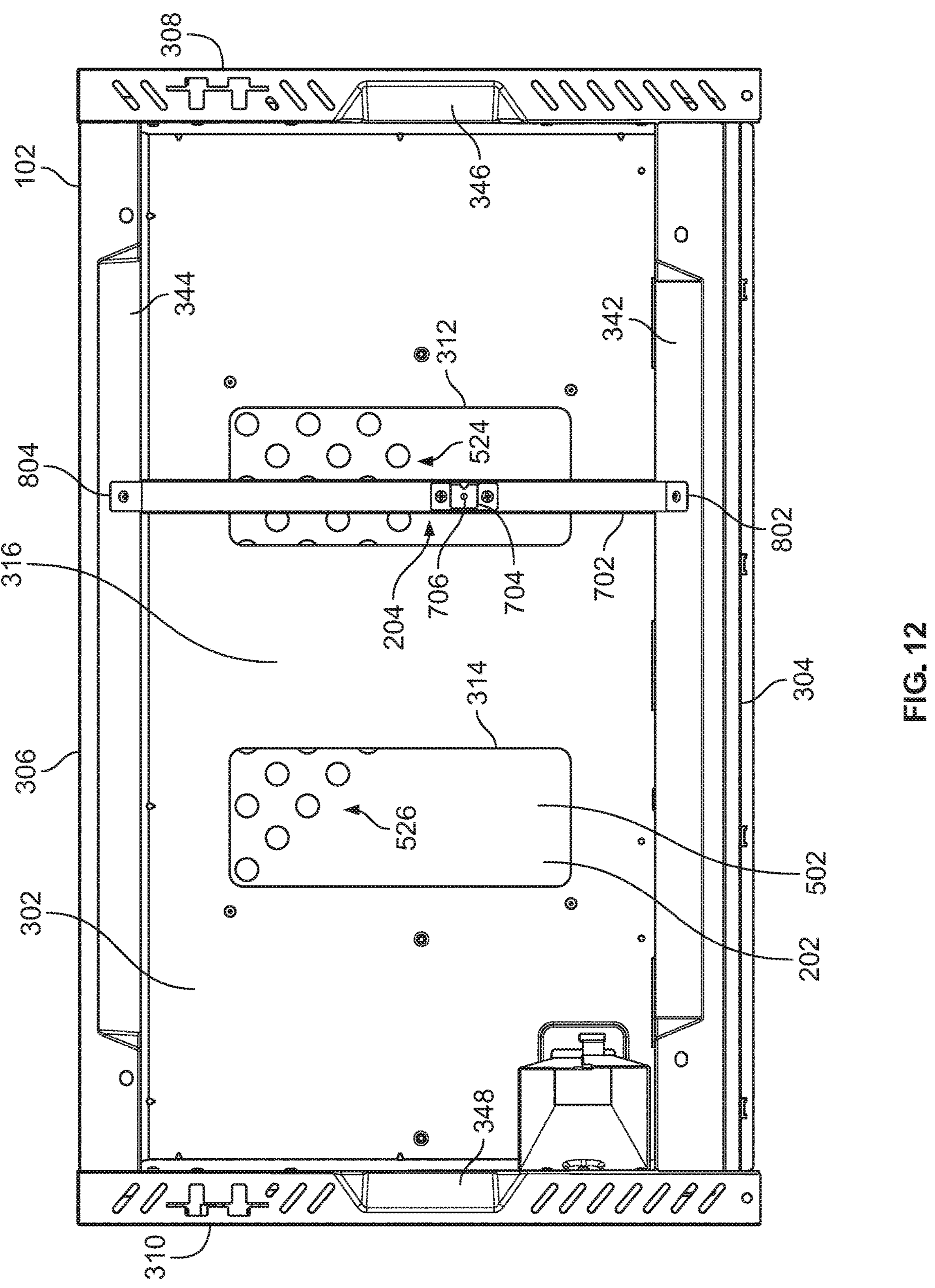
FIG. 12 is a top view of the cookbox, the heat shield, and the temperature sensor assembly of FIG. 11.

FIG. 11 is a perspective view of the cookbox 102 of FIGS. 3 and 4 with the heat shield 202 of FIGS. 5 and 6 and the temperature sensor assembly 204 of FIGS. 7-10 shown coupled to the cookbox 102. FIG. 12 is a top view of the cookbox 102, the heat shield 202, and the temperature sensor assembly 204 of FIG. 11. In the illustrated example of FIGS. 11 and 12, the heat shield 202 is coupled (e.g., via the first mounting flange 512 and the second mounting flange 514 of the heat shield 202) to the bottom wall 302 of the cookbox 102. The panel 502 of the heat shield 202 is spaced apart from and located below the bottom wall 302 of the cookbox 102, with the panel 502 extending across the first air intake opening 312 and the second air intake opening 314 formed in the bottom wall 302 of the cookbox 102. One or more first opening(s) from among the first plurality of openings 524 formed in the panel 502 of the heat shield 202 is/are located below and laterally aligned with the first air intake opening 312 formed in the bottom wall 302 of the cookbox 102, and one or more second opening(s) from among the second plurality of openings 526 formed in the panel 502 of the heat shield 202 is/are located below and laterally aligned with the second air intake opening 314 formed in the bottom wall 302 of the cookbox 102.

In the illustrated example of FIGS. 11 and 12, the first mounting flange 512 of the heat shield 202 is located to the right of the first air intake opening 312, and the second mounting flange 512 of the heat shield 202 is located to the left of the second air intake opening 314. The front lip 504 of the heat shield 202 is located forward of both the first air intake opening 312 and the second air intake opening 314, and the rear lip 506 of the heat shield 202 is located rearward of both the first air intake opening 312 and the second air intake opening 314. In other examples, the respective positions and/or locations of the first mounting flange 512, the second mounting flange 514, the front lip 504, and/or the rear lip 506 of the heat shield 202 relative to the first air intake opening 312 and/or the second air intake opening 314 of the cookbox 102 may differ from the position(s) and/or the location(s) shown in the example of FIGS. 11 and 12.

In the illustrated example of FIGS. 11 and 12, the temperature sensor assembly 204 is coupled to the cookbox 102. More specifically, the crossbar 702 of the temperature sensor assembly 204 is coupled to the cookbox 102, with the first end 802 of the crossbar 702 being coupled (e.g., via a first fastener) to the front wall 304 of the cookbox 102, and with the second end 804 of the crossbar 702 being coupled (e.g., via a second fastener) to the rear wall 306 of the cookbox 102. The crossbar 702 of the temperature sensor assembly 204 accordingly extends between the front wall 304 and the rear wall 306 of the cookbox 102. In the illustrated example of FIGS. 11, and 12, the first end 802 of the crossbar 702 is located along and/or within the first recess 342 formed in the front wall 304 of the cookbox 102, and the second end 804 of the crossbar 702 is located along and/or within the second recess 344 formed in the rear wall 306 of the cookbox 102. In other examples, the first end 802 and the second end 804 of the crossbar 702 can respectively be coupled to the front wall 304 and the rear wall 306 of the cookbox 102 without the first end 802 of the crossbar 702 being located along and/or within the first recess 342 formed in the front wall 304 of the cookbox 102, and/or without the second end 804 of the crossbar 702 being located along and/or within the second recess 344 formed in the rear wall 306 of the cookbox 102.

In the illustrated example of FIGS. 11 and 12, the temperature probe 706 of the temperature sensor assembly 204 is located above and laterally aligned with the first air intake opening 312 formed in the bottom wall 302 of the cookbox 102. In other examples, the temperature probe 706 of the temperature sensor assembly 204 can instead be located above and laterally aligned with the second air intake opening 314 formed in the bottom wall 302 of the cookbox 102. In still other examples, the temperature probe 706 of the temperature sensor assembly 204 can instead be located above and laterally aligned with a solid portion of the bottom wall 302 of the cookbox 102, including either the solid portion 316 that is located between the first air intake opening 312 and the second air intake opening 314, a solid portion that is located to the right of the first air intake opening 312, or a solid portion that is located to the left of the second air intake opening 314.

Figure 13:
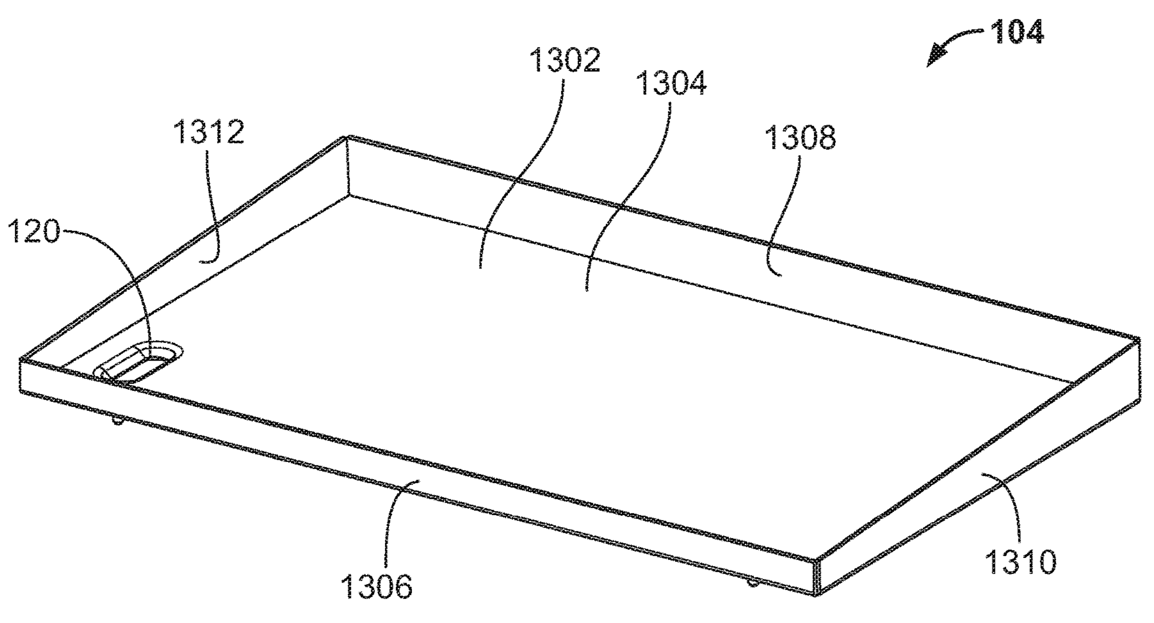
FIG. 13 is a first perspective view showing the griddle of the grill of FIGS. 1 and 2 in isolation.
Figure 14:
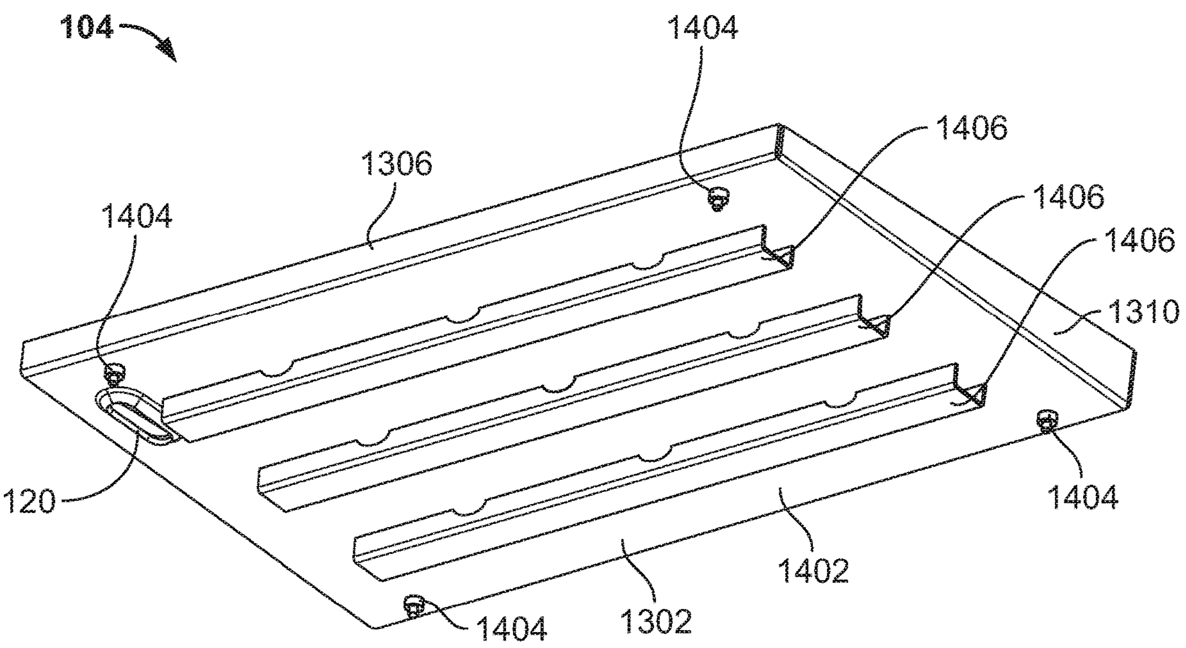
FIG. 14 is a second perspective view of the griddle of FIG. 13.

FIG. 13 is a first perspective view showing the griddle 104 of the grill 100 of FIGS. 1 and 2 in isolation. FIG. 14 is a second perspective view of the griddle 104 of FIG. 13. As shown in FIGS. 13 and 14, the griddle 104 includes an example base 1302. The base 1302 of the griddle 104 includes an example flat top cooking surface 1304 and an example underside 1402 located opposite the flat top cooking surface 1304. In the illustrated example of FIGS. 13 and 14, the flat top cooking surface 1304 is a continuous, substantially flat and/or substantially planar surface that is free of openings aside from the upper waste disposal opening 120 described herein. The flat top cooking surface 1304 is configured to support a variety of liquid, semi-liquid, and/or solid food items during a variety of cooking processes that may be performed on the griddle 104. In the illustrated example of FIGS. 13 and 14, the flat top cooking surface 1304 and/or, more generally, the base 1302 of the griddle 104 has a generally rectangular profile. In other examples, the flat top cooking surface 1304 and/or, more generally, the base 1302 of the griddle 104 can instead have a non-rectangular profile (e.g., a circular profile, an oval profile, a triangular profile, a trapezoidal profile, etc.).

The griddle 104 further includes an example front lip 1306, and an example rear lip 1308, an example right side lip 1310, and an example left side lip 1312. The rear lip 1308 of the griddle 104 is located opposite the front lip 1306 of the griddle 104. The right side lip 1310 of the griddle 104 extends between the front lip 1306 and the rear lip 1308 of the griddle 104. The left side lip 1312 of the griddle 104 is located opposite the right side lip 1310 of the griddle 104 and extends between the front lip 1306 and the rear lip 1308 of the griddle 104. The front lip 1306, the rear lip 1308, the right side lip 1310, and the left side lip 1312 of the griddle 104 extend upwardly from the base 1302 of the griddle 104 to provide vertical boundaries configured to prevent food items from sliding off the flat top cooking surface 1304 of the griddle 104 during one or more cooking operation(s) performed thereon.

As shown in FIGS. 13 and 14, the upper waste disposal opening 120 formed in the base 1302 of the griddle 104 extends completely through the base 1302 (e.g., from the flat top cooking surface 1304 of the base 1302 through to the underside 1402 of the base 1302). The upper waste disposal opening 120 facilitates the removal and/or disposal of liquid and/or solid cooking waste (e.g., grease, residue, particles, and/or other byproducts associated with a cooking operation) located on the flat top cooking surface 1304 of the griddle 104, as further described above. In the illustrated example of FIGS. 13 and 14, the upper waste disposal opening 120 is located proximate the front left corner of the base 1302 of the griddle 104 (e.g., near the junction of the front lip 1306 and the left side lip 1312 of the griddle 104). In other examples, the upper waste disposal opening 120 can instead be located proximate some other portion (e.g., the rear left corner, the front right corner, the rear right corner, etc.) of the base 1302 of the griddle 104.

The griddle 104 further includes a plurality of example griddle support members 1404 (e.g., vertically oriented posts) coupled to and extending downwardly from the underside 1402 of the base 1302 of the griddle 104. The griddle support members 1404 are configured to support the underside 1402 and/or, more generally, the base 1302 of the griddle 104 on, above, or at the cookbox 102 of the grill 100, and/or on, above, or at the upper rim 140 of the grill 100. In this regard, respective ones of the griddle support members 1404 of the griddle 104 are configured to be received by and/or to otherwise engage corresponding ones of the griddle docking openings 358 of the cookbox 102 of the grill 100. In the illustrated example of FIGS. 13 and 14, the griddle 104 includes a total of four griddle support members 1404 configured to be received by and/or to otherwise engage a total of four griddle docking openings 358. In other examples, the griddle 104 can instead include a different number (e.g., two, three, five, six, etc.) of griddle support members 1404, and the cookbox 102 can similarly include a corresponding different number (e.g., two, three, five, six, etc.) of griddle docking openings 358.

The griddle 104 further includes a plurality of example anti-warping braces 1406 coupled to and extending downwardly from the underside 1402 of the base 1302 of the griddle 104. The anti-warping braces 1406 are configured to support, strengthen, and/or brace the underside 1402 and/or, more generally, the base 1302 of the griddle 104 to limit and/or prevent any buckling and/or warping thereof. As shown in FIGS. 13 and 14, the anti-warping braces 1406 are arranged in a right-to-left orientation along the underside 1402 of the base 1302 of the griddle 104. In other examples, the anti-warping braces 1406 can instead be arranged in a different orientation (e.g., a front-to-rear orientation, a diagonal orientation, etc.) along the underside 1402 of the base 1302 of the griddle 104. In the illustrated example of FIGS. 13 and 14, the griddle 104 includes a total of three anti-warping braces 1406. In other examples, the griddle 104 can instead include a different number (e.g., one, two, four, etc.) of anti-warping braces 1406. In the illustrated example of FIGS. 13 and 14, the each one of the anti-warping braces 1406 has a C-shaped cross-sectional profile. In other examples, one or more of the anti-warping braces 1406 can instead have a cross-section profile of a different shape (e.g., a V-shaped cross-sectional profile).

In the illustrated example of FIGS. 13 and 14, the flat top cooking surface 1304 and/or, more generally, the base 1302 of the griddle 104 has a width (e.g., measured between the right side lip 1310 to the left side lip 1312) of approximately 30.0 inches, a depth (e.g., measured between the front lip 1306 and the rear lip 1308) of approximately 18.0 inches, and an associated total area (e.g., calculated as width multiplied by depth) of approximately 540.0 square inches. In other examples, the width, the depth, and/or the total area of the flat top cooking surface 1304 can differ from the above-described dimensions.

Figure 15:
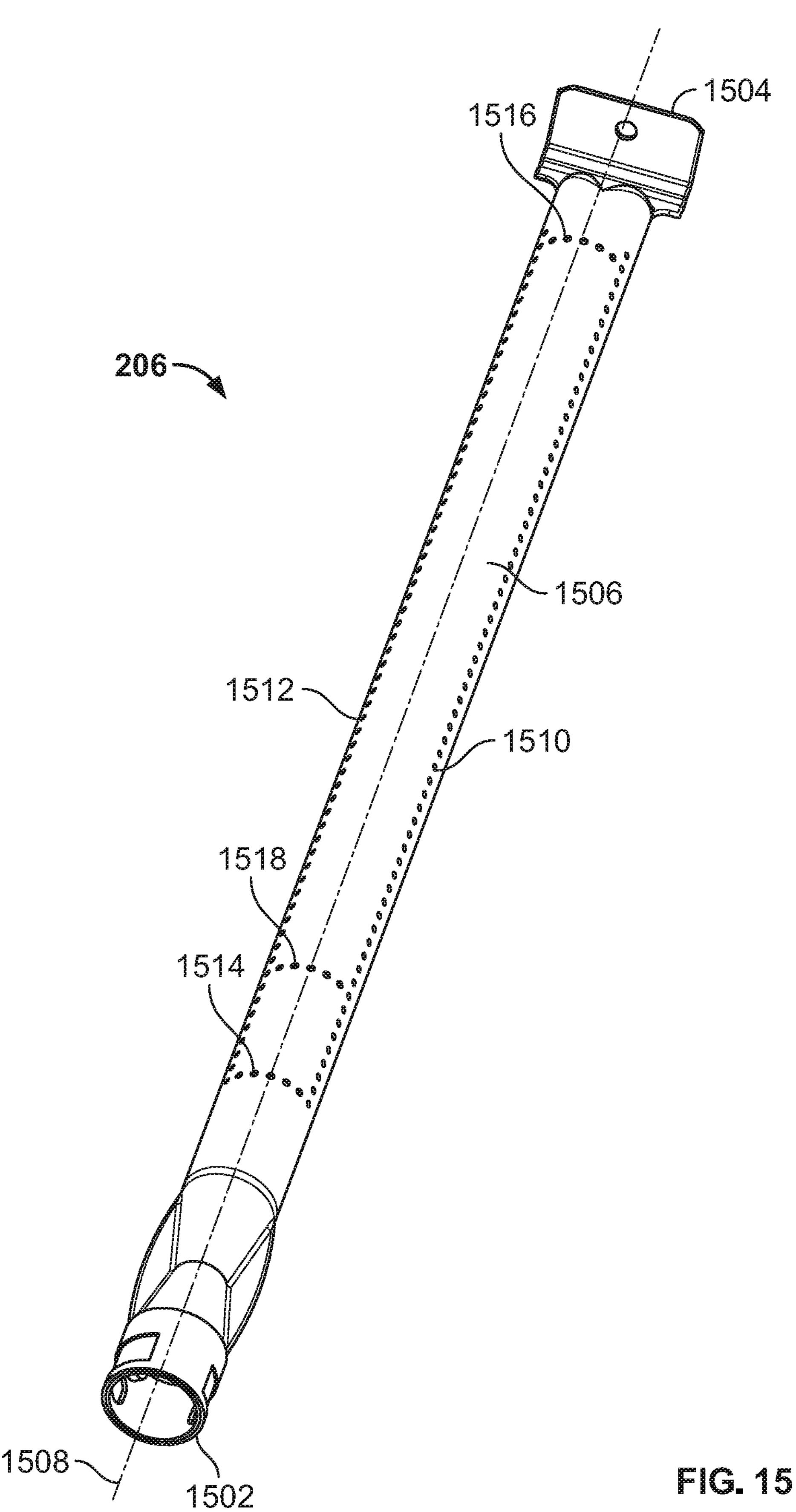
FIG. 15 is a perspective view showing the first burner tube of the grill of FIGS. 1 and 2 in isolation.
Figure 16:
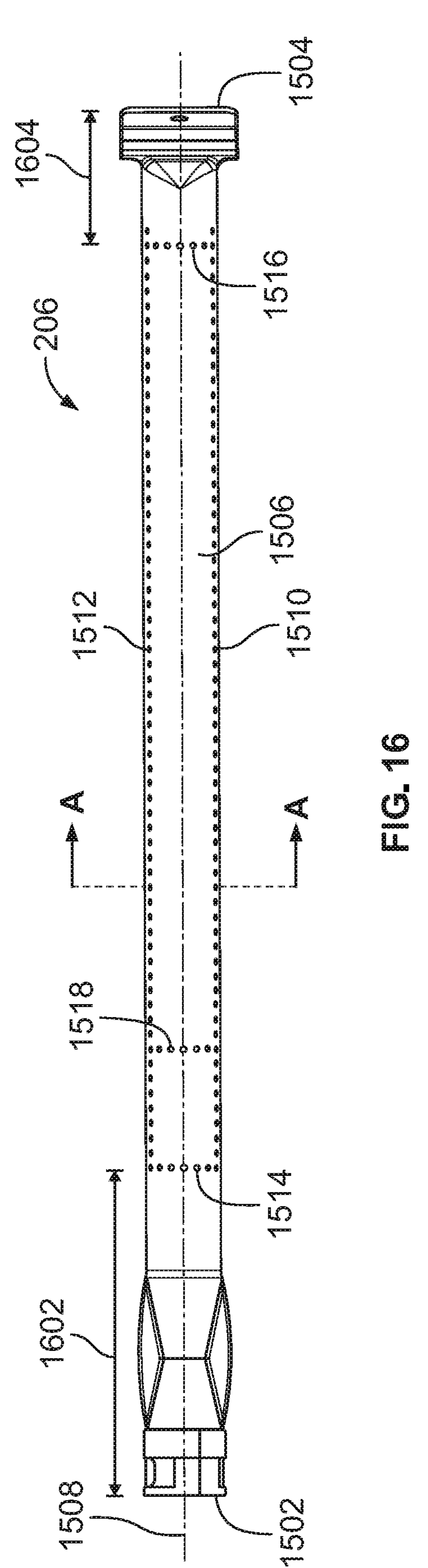
FIG. 16 is a top view of the first burner tube of FIG. 15.
Figure 17:
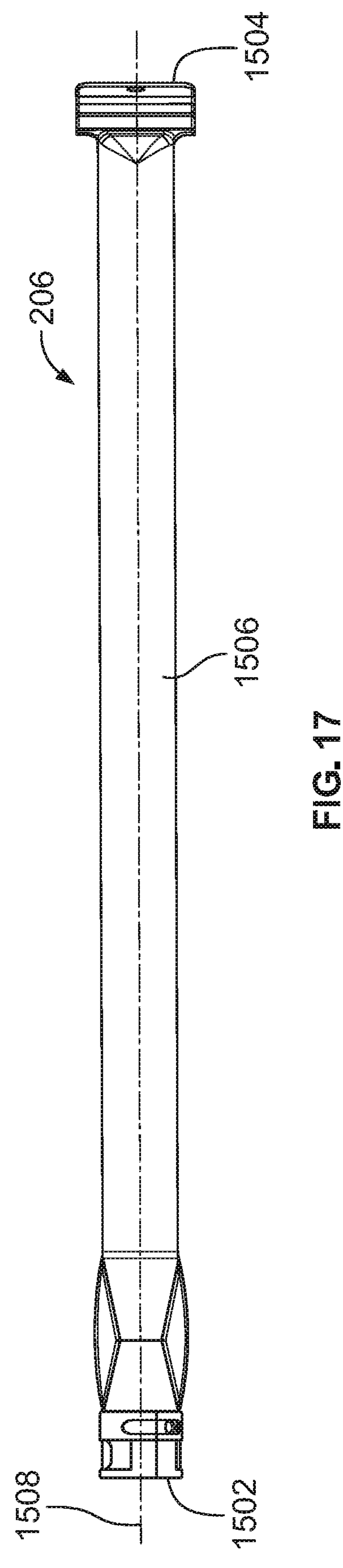
FIG. 17 is a bottom view of the first burner tube of FIGS. 15 and 16.
Figures 18, 19:
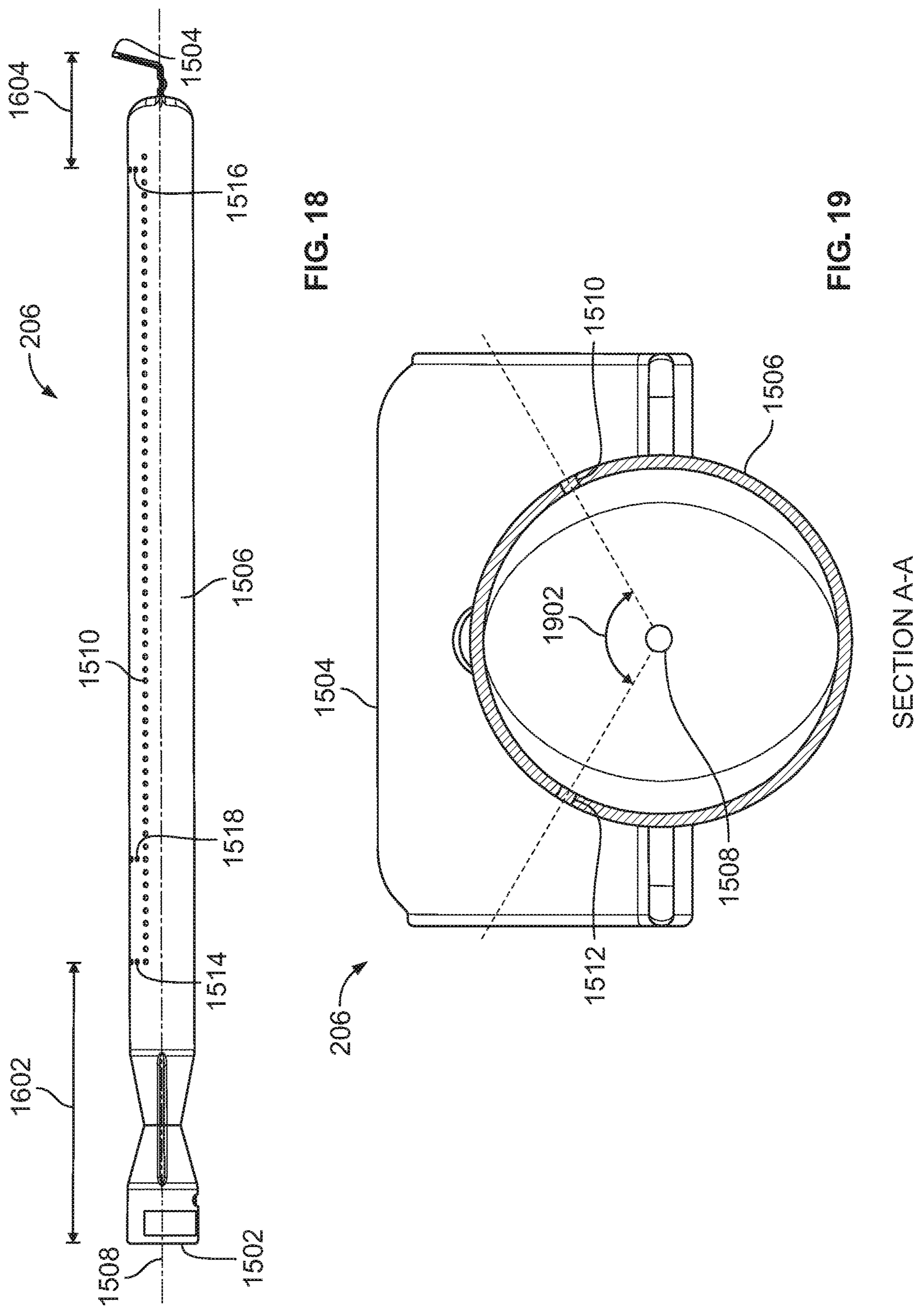
FIG. 18 is a right side view of the first burner tube of FIGS. 15-17.
FIG. 19 is a cross-sectional view of the first burner tube of FIGS. 15-18 taken along section A-A of FIG. 16.

FIG. 15 is a perspective view showing the first burner tube 206 of the grill 100 of FIGS. 1 and 2 in isolation. FIG. 16 is a top view of the first burner tube 206 of FIG. 15. FIG. 17 is a bottom view of the first burner tube 206 of FIGS. 15 and 16. FIG. 18 is a right side view of the first burner tube 206 of FIGS. 15-17. FIG. 19 is a cross-sectional view of the first burner tube 206 of FIGS. 15-18 taken along section A-A of FIG. 16. The construction of the second burner tube 208 and the third burner tube 210 of the grill 100 of FIGS. 1 and 2 is substantially identical to that of the first burner tube 206 as described herein in connection with FIGS. 15-19.

As shown in FIGS. 15-19, the first burner tube 206 includes an example first end 1502 (e.g., a front end), an example second end 1504 (e.g., a rear end), an example outer wall 1506 extending between the first end 1502 and the second end 1504, and an example central axis 1508 extending between the first end 1502 and the second end 1504. The first end 1502 of the first burner tube 206 is partially open, with the first end 1502 being configured to receive an outlet of a control valve (e.g., the outlet of the first control valve 214) located proximate the front wall 304 of the cookbox 102. The second end 1504 of the first burner tube 206 is closed, with the second end 1504 being configured to be coupled to a mounting flange located proximate the rear wall 306 of the cookbox 102. The first burner tube 206 is accordingly configured to be arranged in a front-to-rear orientation when disposed in the cookbox 102. In the illustrated example of FIGS. 15-19, the first burner tube 206 is structured as a linear burner tube having a circular cross-sectional profile. In other example, the first burner tube 206 can instead be structured as a linear burner tube having a different cross-sectional profile (e.g., a rectangular cross-sectional profile, an oval-shaped cross-sectional profile, a triangular cross-sectional profile, a trapezoidal cross-sectional profile, etc.). In still other examples, the first burner tube 206 can instead be structured as a non-linear burner tube having one or more bend(s) and/or curve(s) formed therein.

The first burner tube 206 of FIGS. 15-19 includes a plurality of ports formed in and extending through the outer wall 1506 of the first burner tube 206. As shown in FIGS. 15-19, the plurality of ports includes an example first row of ports 1510, an example second row of ports 1512, an example third row of ports 1514, and an example fourth row of ports 1516. The first row of ports 1510 is arranged parallel to the central axis 1508. The second row of ports 1512 is also arranged parallel to the central axis 1508, with the second row of ports 1512 being spaced apart from (e.g., angularly displaced from) the first row of ports 1510 about the perimeter (e.g., about the circumference) of the outer wall 1506 of the first burner tube 206. The third row of ports 1514 is arranged perpendicular to the central axis 1508. The fourth row of ports 1516 is also arranged perpendicular to the central axis 1508, with the fourth row of ports 1516 being spaced apart from (e.g., longitudinally displaced from) the third row of ports 1514 along the central axis 1508 of the first burner tube 206. In the illustrated example of FIGS. 15-19, the third row of ports 1514 is located proximate the first end 1502 (e.g., the front end) of the first burner tube 206, and the fourth row of ports 1516 is located proximate the second end 1504 (e.g., the rear end) of the first burner tube 206. The first burner tube 206 can include additional ports and/or additional rows of ports relative to those described above. For example, as shown in FIGS. 15-19, the first burner tube 206 further includes an example fifth row of ports 1518 arranged perpendicular to the central axis 1508, with the fifth row of ports 1518 being spaced apart from and proximate to the third row of ports 1514.

As shown in FIGS. 15-19, the outer wall 1506 of the first burner tube 206 has a circular cross-sectional profile. The second row of ports 1512 is angularly displaced from the first row of ports 1510 about the circumference of the outer wall 1506 by an example angle 1902 measuring approximately 120.0 degrees. In other examples, the angle 1902 at which the second row of ports 1512 is angularly displaced from the first row of ports 1510 about the circumference of the outer wall 1506 can be between 90.0 and 150.0 degrees. Satisfaction of the above-described range of the angle 1902 at which the second row of ports 1512 is angularly displaced from the first row of ports 1510 about the circumference of the outer wall 1506 advantageously improves the operating efficiency of the cooking engine of the grill 100, and also improves the heat distribution properties associated with the griddle 104 of the grill 100. In this regard, satisfaction of the above-described range of the angle 1902 at which the second row of ports 1512 is angularly displaced from the first row of ports 1510 about the circumference of the outer wall 1506 advantageously assists in minimizing any temperature variation across the flat top cooking surface 1304 of the griddle 104 during cooking operations performed thereon.

The first burner tube 206 of FIGS. 15-19 is further configured such that the third row of ports 1514 of the first burner tube 206 is spaced apart from the first end 1502 (e.g., the front end) of the first burner tube 206 by an example distance 1602 of approximately 4.4 inches. In other examples, the distance 1602 between the third row of ports 1514 and the first end 1502 of the first burner tube 206 can be between 1.0 and 6.0 inches. Satisfaction of the above-described range of the distance 1602 between the third row of ports 1514 and the first end 1502 of the first burner tube 206 advantageously improves the operating efficiency of the cooking engine of the grill 100, and also improves the heat distribution properties associated with the griddle 104 of the grill 100. In this regard, satisfaction of the above-described range of the distance 1602 between the third row of ports 1514 and the first end 1502 of the first burner tube 206 advantageously assists in minimizing any temperature variation across the flat top cooking surface 1304 of the griddle 104 during cooking operations performed thereon.

The first burner tube 206 of FIGS. 15-19 is further configured such that the fourth row of ports 1516 of the first burner tube 206 is spaced apart from the second end 1504 (e.g., the rear end) of the first burner tube 206 by an example distance 1604 of approximately 1.8 inches. In other examples, the distance 1604 between the fourth row of ports 1516 and the second end 1504 of the first burner tube 206 can be between 1.0 and 6.0 inches. Satisfaction of the above-described range of the distance 1604 between the fourth row of ports 1516 and the second end 1504 of the first burner tube 206 advantageously improves the operating efficiency of the cooking engine of the grill 100, and also improves the heat distribution properties associated with the griddle 104 of the grill 100. In this regard, satisfaction of the above-described range of the distance 1604 between the fourth row of ports 1516 and the second end 1504 of the first burner tube 206 advantageously assists in minimizing any temperature variation across the flat top cooking surface 1304 of the griddle 104 during cooking operations performed thereon.

In the illustrated example of FIGS. 15-19, the first burner tube 206 has a length of approximately 18.6 inches measured along the central axis 1508 from the first end 1502 (e.g., the front end) to the second end 1504 (e.g., the rear end) of the first burner tube 206. In other examples, the first burner tube 206 can instead have a length that is substantially greater than or substantially less than 18.6 inches. In the illustrated example of FIGS. 15-19, the outer wall 1506 of the first burner tube 206 has a diameter of approximately 1.0 inches measured across the circular cross-sectional profile of the outer wall 1506. In other examples, the first burner tube 206 can instead have a diameter that is substantially greater than or substantially less than 1.0 inches. In the illustrated example of FIGS. 15-19, each one of the ports formed in and extending through the outer wall 1506 of the first burner tube 206 has a diameter ranging between approximately 0.07 inches and 0.08 inches measured across the circular outlet opening of the port. In other examples, one or more of the ports formed in and extending through the outer wall 1506 of the first burner tube 206 can instead have a diameter that is substantially less than 0.07 inches or substantially greater than 0.08 inches.

Figure 20:
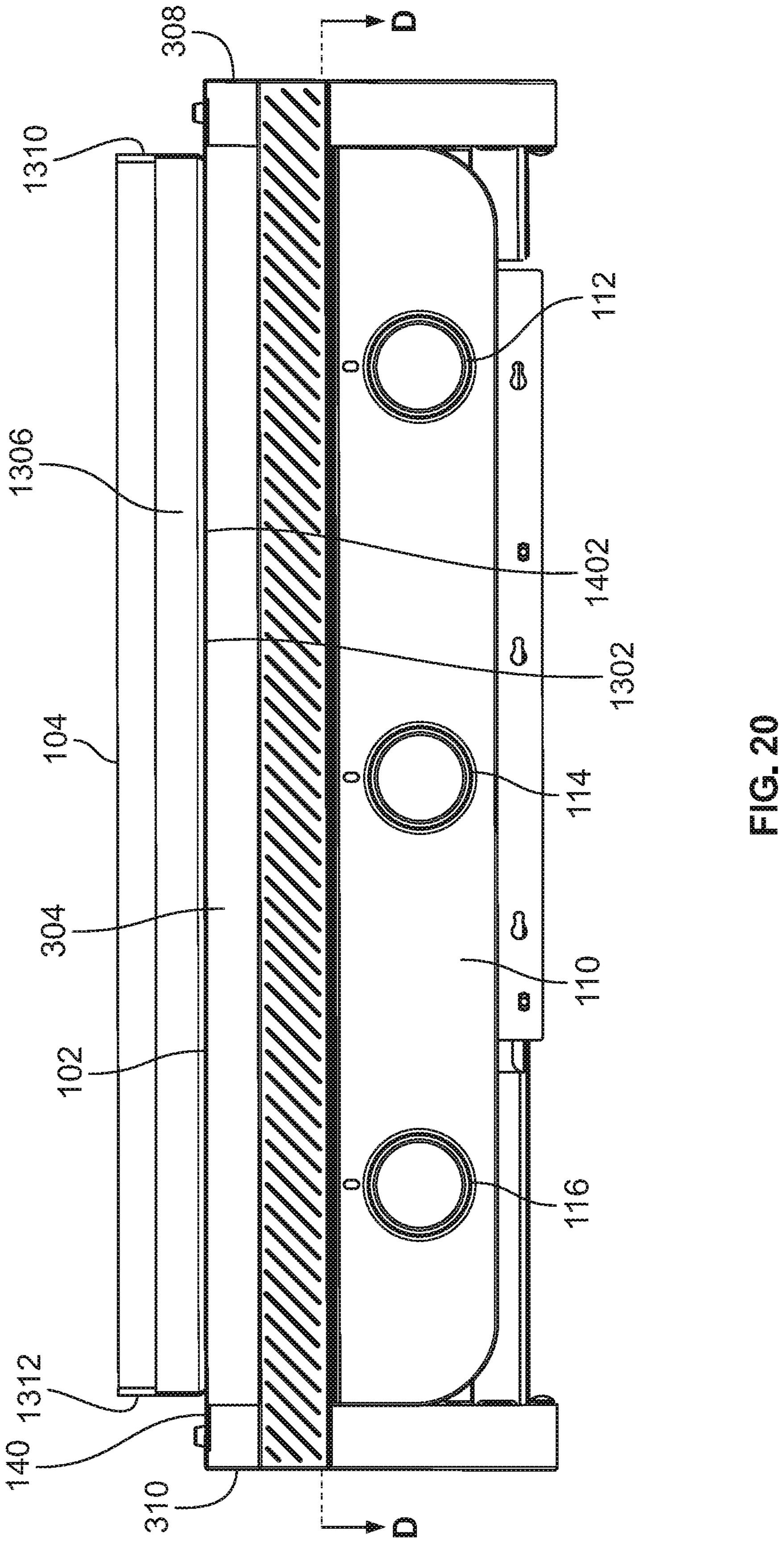
FIG. 20 is a front view showing the grill of FIGS. 1 and 2, with the frame, the lid, and certain other structural features of the grill omitted for enhanced viewability.
Figure 21:
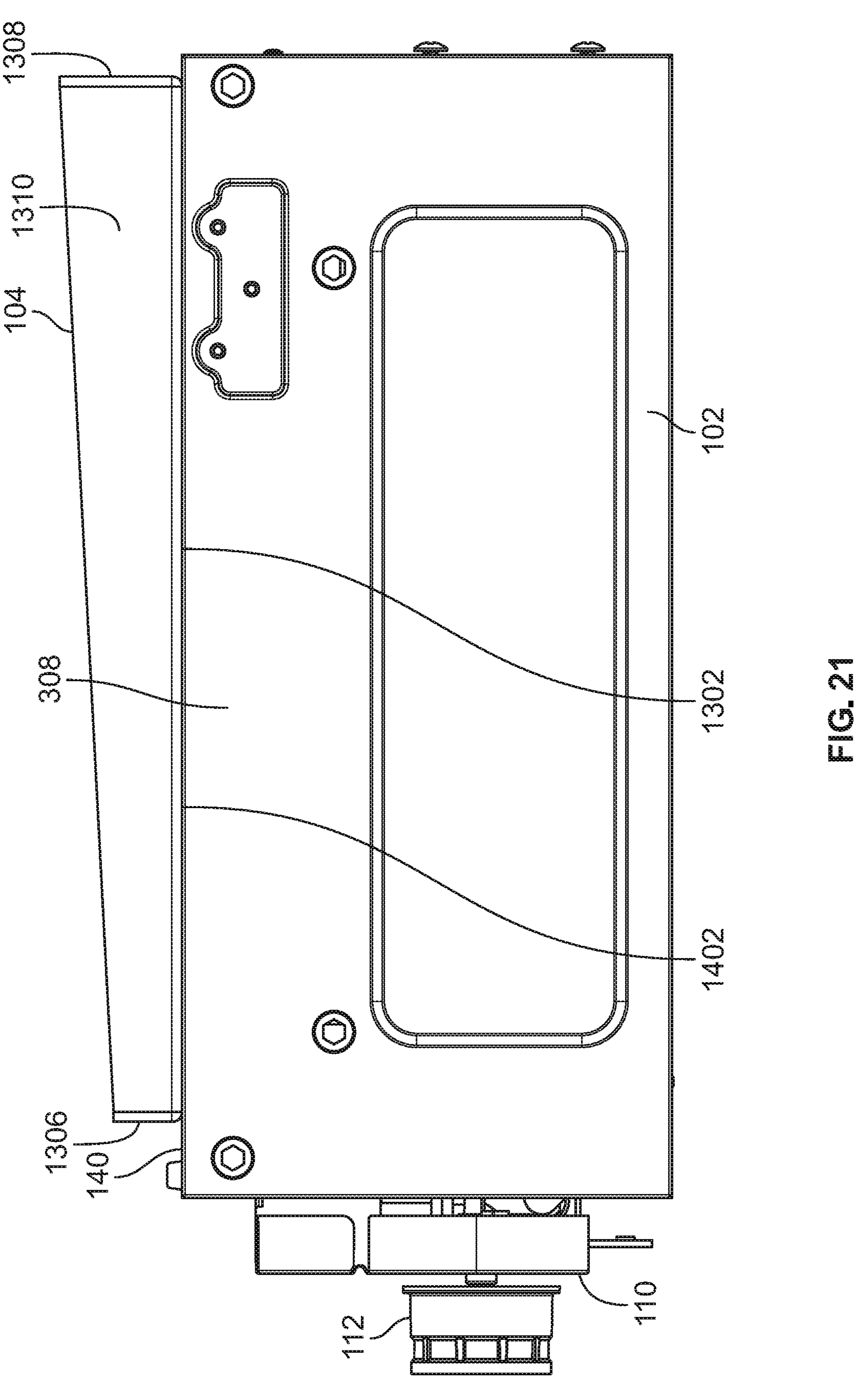
FIG. 21 is a right side view of the grill of FIG. 20.
Figure 22:
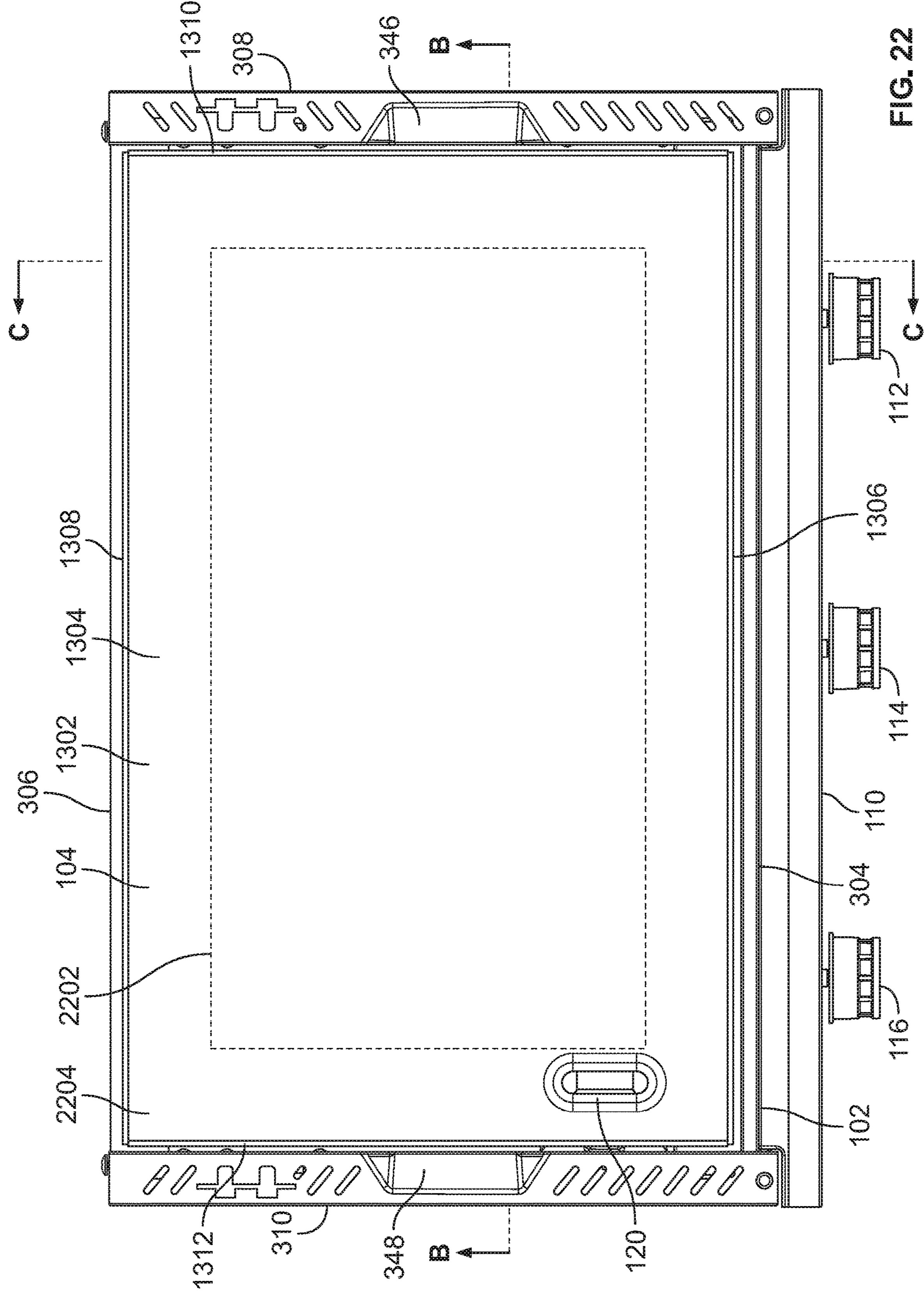
FIG. 22 is a top view of the grill of FIGS. 20 and 21.
Figure 23:
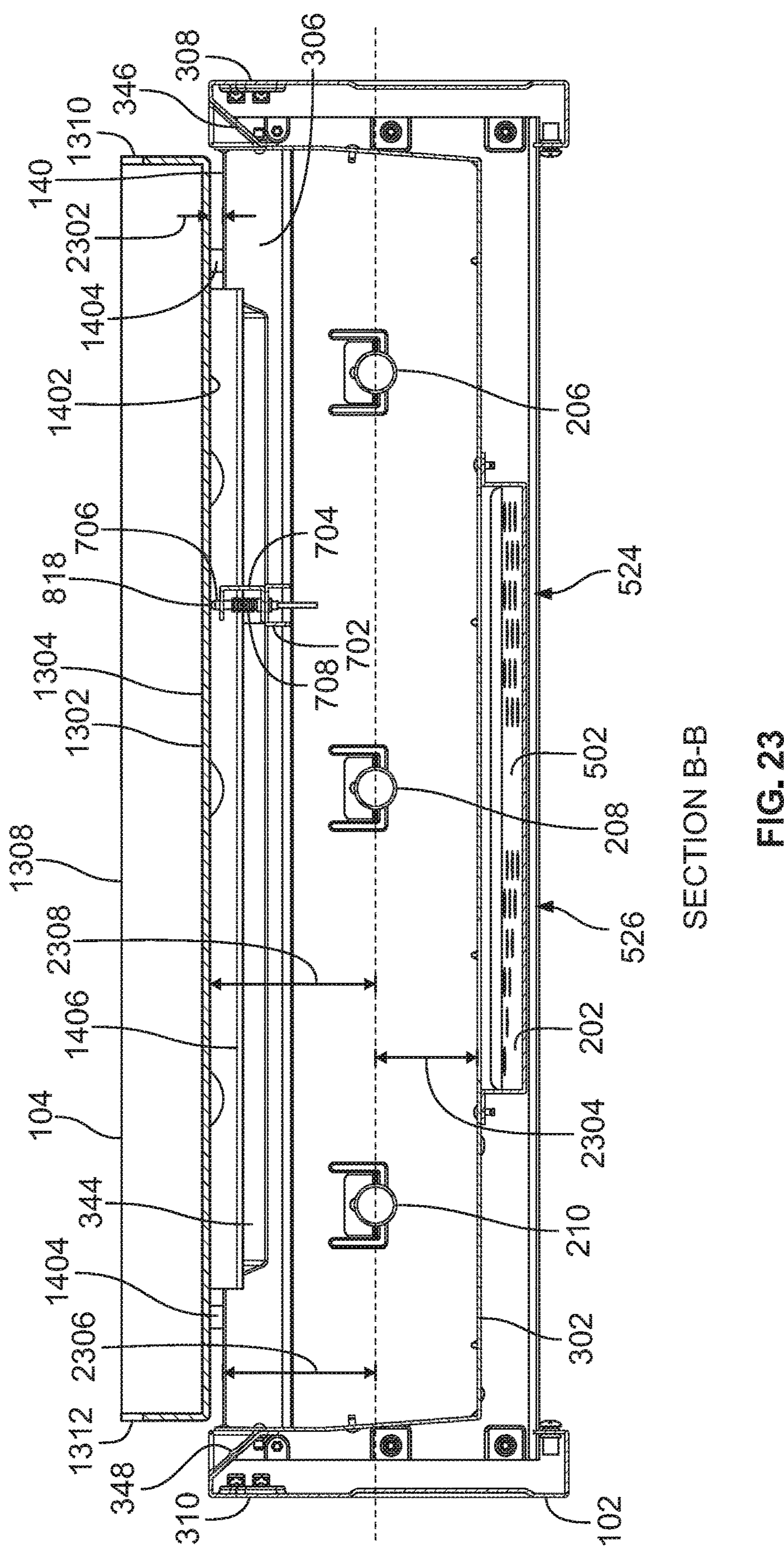
FIG. 23 is a cross-sectional view of the grill of FIGS. 20-22 taken along section B-B of FIG. 22.
Figure 24:
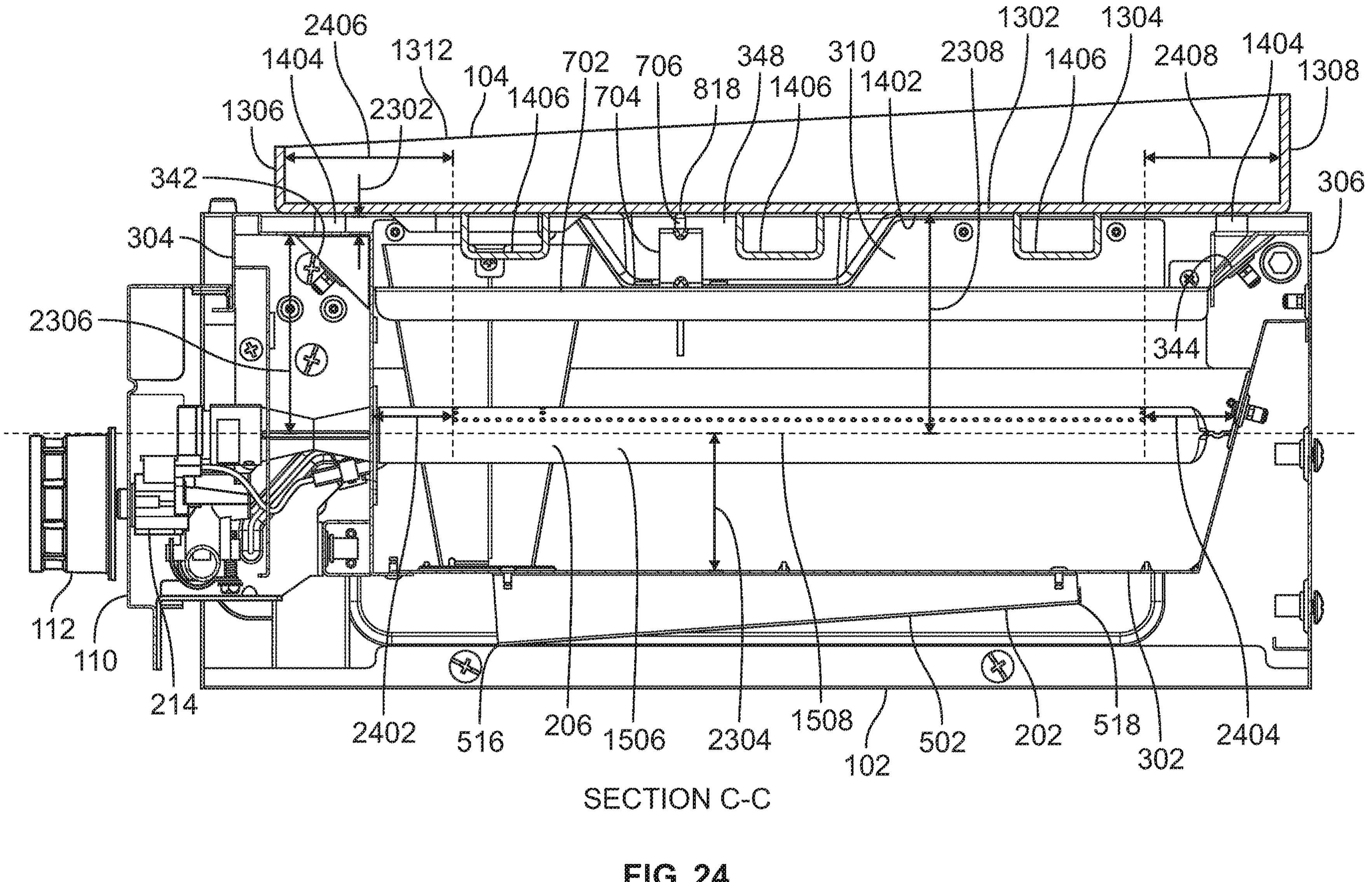
FIG. 24 is a cross-sectional view of the grill of FIGS. 20-23 taken along section C-C of FIG. 22.
Figure 25:
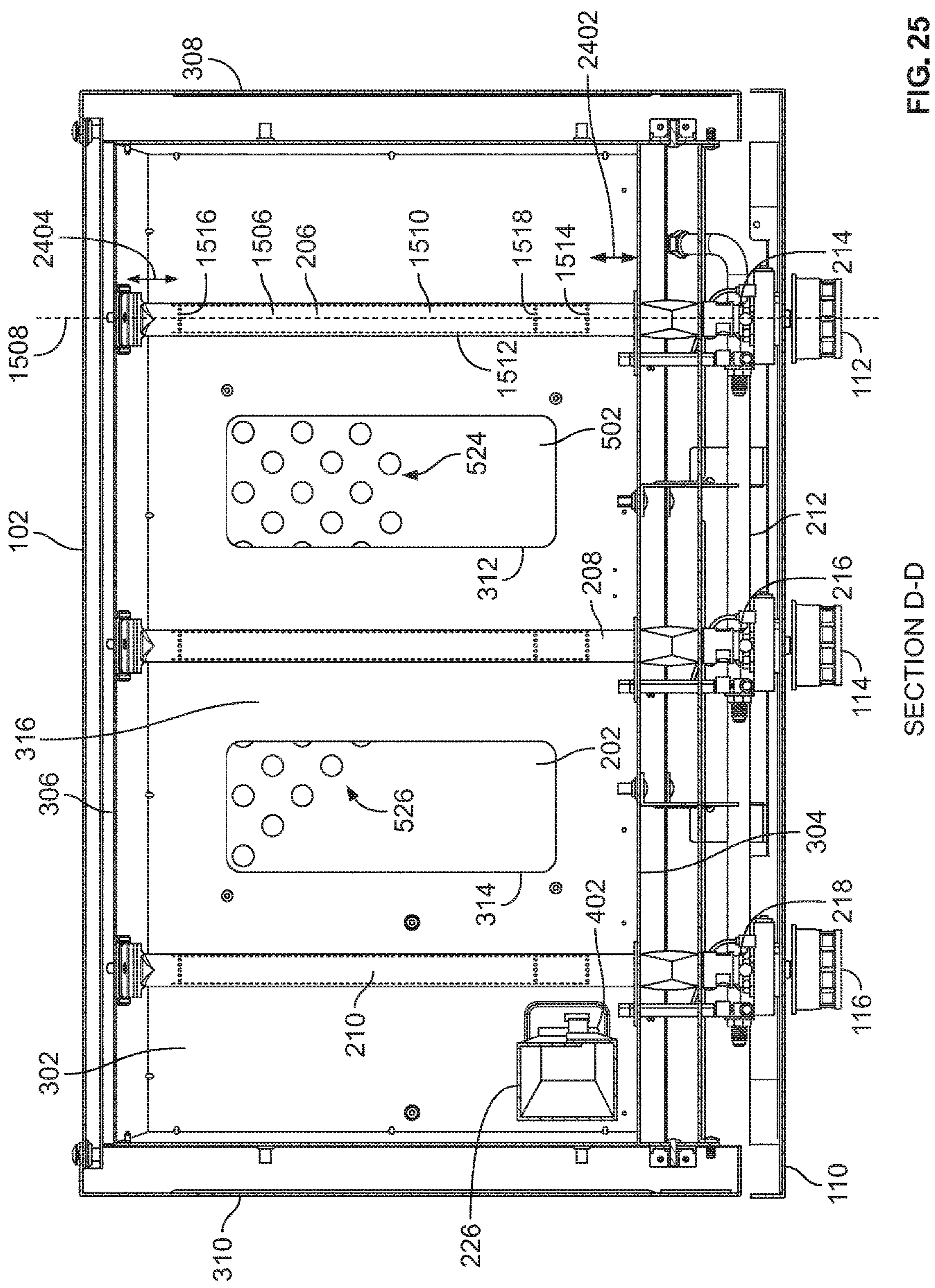
FIG. 25 is a cross-sectional view of the grill of FIGS. 20-24 taken along section D-D of FIG. 20.

FIG. 20 is a front view showing the grill 100 of FIGS. 1 and 2, with the frame 122, the lid 136, and certain other structural features of the grill 100 omitted for enhanced viewability. FIG. 21 is a right side view of the grill 100 of FIG. 20. FIG. 22 is a top view of the grill 100 of FIGS. 20 and 21. FIG. 23 is a cross-sectional view of the grill 100 of FIGS. 20-22 taken along section B-B of FIG. 22. FIG. 24 is a cross-sectional view of the grill 100 of FIGS. 20-23 taken along section C-C of FIG. 22. FIG. 17 is a cross-sectional view of the grill 100 of FIGS. 20-24 taken along section D-D of FIG. 20.

As shown in FIGS. 20-25, the griddle 104 of the grill 100 is disposed on or above the cookbox 102 of the grill 100. More specifically, the griddle 104 is removably positioned and/or docked on the upper rim 140 of the cookbox 102 via engagement of the griddle support members 1404 of the griddle 104 and the griddle docking openings 358 of the cookbox 102. As further shown in FIGS. 20-25, the underside 1402 of the griddle 104 is located between the right sidewall 308 and the left sidewall 310 of the cookbox 102, and above the front wall 304 and the rear wall 306 of the cookbox 102. The underside 1402 of the griddle 104 is spaced apart from the lowered portion of the upper surface 318 of the front wall 304 and the upper surface 324 of the rear wall 306 by an example vertical gap 2302 configured to vent heated air generated within the cookbox 102 (e.g., heated air generated via the first burner tube 206, the second burner tube 208, and/or the third burner tube 210). The presence of the vertical gap 2302 in combination with the presence of the first recess 342, the second recess 344, the third recess 346, and the fourth recess 348 advantageously facilitates even and/or uniform venting of heat from the cookbox 102 (e.g., along each of the front wall 304, the rear wall 306, the right sidewall 308, and the left sidewall 310 of the cookbox 102) relative to the griddle 104 (e.g., along the front lip 1306, the rear lip 1308, the right side lip 1310, and the left side lip 1312 of the griddle 104).

In the illustrated example of FIGS. 20-25, the vertical gap 2302 has a height of approximately 0.02 inches. In other examples, the vertical gap 2302 can have a height between 0.01 and 1.00 inches. Satisfaction of the above-described range of the height of the vertical gap 2302 advantageously improves the operating efficiency of the cooking engine of the grill 100, and also improves the heat distribution properties associated with the griddle 104 of the grill 100. In this regard, satisfaction of the above-described range of the height of the vertical gap 2302 advantageously assists in minimizing any temperature variation across the flat top cooking surface 1304 of the griddle 104 during cooking operations performed thereon.

As shown in FIGS. 20-25, the burner tubes (e.g., the first burner tube 206, the second burner tube 208, and the third burner tube 210) of the grill 100 are disposed within the cookbox 102 of the grill 100 at a location between the bottom wall 302 of the cookbox 102 and the underside 1402 of the griddle 104. More specifically, the burner tubes (e.g., the first burner tube 206, the second burner tube 208, and the third burner tube 210) of the grill 100 are disposed within the cookbox 102 of the grill 100 at a location between the bottom wall 302 of the cookbox 102 and the upper rim 140 of the cookbox 102, with respective ones of the burner tubes being laterally spaced apart from one another and arranged in a front-to-rear orientation. As shown in FIGS. 20-25, the first burner tube 206 is laterally positioned to the right side of the first air intake opening 312 formed in the bottom wall 302 of the cookbox 102. The second burner tube 208 is laterally positioned to the left side of the first air intake opening 312 formed in the bottom wall 302 of the cookbox 102 and to the right side of the second air intake opening 314 formed in the bottom wall 302 of the cookbox 102. The second burner tube 208 is accordingly located between the first air intake opening 312 and the second air intake opening 314 formed in the bottom wall 302 of the cookbox 102, such that the second burner tube 208 is laterally aligned with the solid portion 316 of the bottom wall 302 of the cookbox 102. The third burner tube 210 is laterally positioned to the left side of the second air intake opening 314 formed in the bottom wall 302 of the cookbox 102.

In the illustrated example of FIGS. 20-25, each of the burner tubes (e.g., the first burner tube 206, the second burner tube 208, and the third burner tube 210) is vertically positioned above the bottom wall 302 of the cookbox 102 by an example distance 2304 of approximately 2.5 inches measured vertically from the bottom wall 302 of the cookbox 102 to the central axis 1508 of the respective burner tube. In other examples, the distance 2304 at which each of the burner tubes is vertically positioned above the bottom wall 302 of the cookbox 102 can be between 1.5 and 3.5 inches. Satisfaction of the above-described range of the distance 2304 at which each of the burner tubes is vertically positioned above the bottom wall 302 of the cookbox 102 advantageously improves the operating efficiency of the cooking engine of the grill 100, and also improves the heat distribution properties associated with the griddle 104 of the grill 100. In this regard, satisfaction of the above-described range of the distance 2304 at which each of the burner tubes is vertically positioned above the bottom wall 302 of the cookbox 102 advantageously assists in minimizing any temperature variation across the flat top cooking surface 1304 of the griddle 104 during cooking operations performed thereon.

In the illustrated example of FIGS. 20-25, each of the burner tubes (e.g., the first burner tube 206, the second burner tube 208, and the third burner tube 210) is vertically positioned below the lowered portion of the upper surface 318 of the front wall 304 and/or the upper surface 324 of the rear wall 306 of the cookbox 102 by an example distance 2306 of approximately 3.7 inches measured vertically from the lowered portion of the upper surface 318 of the front wall 304 and/or the upper surface 324 of the rear wall 306 of the cookbox 102 to the central axis 1508 of the respective burner tube. In other examples, the distance 2306 at which each of the burner tubes is vertically positioned below the lowered portion of the upper surface 318 of the front wall 304 and/or the upper surface 324 of the rear wall 306 of the cookbox 102 can be between 2.0 and 5.0 inches. Satisfaction of the above-described range of the distance 2306 at which each of the burner tubes is vertically positioned below the lowered portion of the upper surface 318 of the front wall 304 and/or the upper surface 324 of the rear wall 306 of the cookbox 102 advantageously improves the operating efficiency of the cooking engine of the grill 100, and also improves the heat distribution properties associated with the griddle 104 of the grill 100. In this regard, satisfaction of the above-described range of the distance 2306 at which each of the burner tubes is vertically positioned below the lowered portion of the upper surface 318 of the front wall 304 and/or the upper surface 324 of the rear wall 306 of the cookbox 102 advantageously assists in minimizing any temperature variation across the flat top cooking surface 1304 of the griddle 104 during cooking operations performed thereon.

In the illustrated example of FIGS. 20-25, each of the burner tubes (e.g., the first burner tube 206, the second burner tube 208, and the third burner tube 210) is vertically positioned below the underside 1402 of the griddle 104 by an example distance 2308 of approximately 3.8 inches measured vertically from the underside 1402 of the griddle

104 to the central axis 1508 of the respective burner tube. In other examples, the distance 2308 at which each of the burner tubes is vertically positioned below the underside 1402 of the griddle 104 can be between 3.0 and 6.0 inches. Satisfaction of the above-described range of the distance 2308 at which each of the burner tubes is vertically positioned below the underside 1402 of the griddle 104 advantageously improves the operating efficiency of the cooking engine of the grill 100, and also improves the heat distribution properties associated with the griddle 104 of the grill 100. In this regard, satisfaction of the above-described range of the distance 2308 at which each of the burner tubes is vertically positioned below the underside 1402 of the griddle 104 advantageously assists in minimizing any temperature variation across the flat top cooking surface 1304 of the griddle 104 during cooking operations performed thereon.

In the illustrated example of FIGS. 20-25, the third row of ports 1514 formed on the outer wall 1506 of each of the burner tubes (e.g., the first burner tube 206, the second burner tube 208, and the third burner tube 210) is positioned inwardly from the front wall 304 of the cookbox 102 by an example distance 2402 of approximately 1.5 inches measured depthwise (e.g., along the central axis 1508 of the respective burner tube) from the front wall 304 of the cookbox 102 to the third row of ports 1514 of the respective burner tube. In other examples, the distance 2402 at which the third row of ports 1514 of the respective burner tube is positioned inwardly from the front wall 304 of the cookbox 102 can be between 1.0 and 6.0 inches. Satisfaction of the above-described range of the distance 2402 at which the third row of ports 1514 of the respective burner tube is positioned inwardly from the front wall 304 of the cookbox 102 advantageously improves the operating efficiency of the cooking engine of the grill 100, and also improves the heat distribution properties associated with the griddle 104 of the grill 100. In this regard, satisfaction of the above-described range of the distance 2402 at which the third row of ports 1514 of the respective burner tube is positioned inwardly from the front wall 304 of the cookbox 102 advantageously assists in minimizing any temperature variation across the flat top cooking surface 1304 of the griddle 104 during cooking operations performed thereon.

In the illustrated example of FIGS. 20-25, the fourth row of ports 1516 formed on the outer wall 1506 of each of the burner tubes (e.g., the first burner tube 206, the second burner tube 208, and the third burner tube 210) is positioned inwardly from the rear wall 306 of the cookbox 102 by an example distance 2404 of approximately 1.8 inches measured depthwise (e.g., along the central axis 1508 of the respective burner tube) from the rear wall 306 of the cookbox 102 to the fourth row of ports 1516 of the respective burner tube. In other examples, the distance 2404 at which the fourth row of ports 1516 of the respective burner tube is positioned inwardly from the rear wall 306 of the cookbox 102 can be between 1.0 and 6.0 inches. Satisfaction of the above-described range of the distance 2404 at which the fourth row of ports 1516 of the respective burner tube is positioned inwardly from the rear wall 306 of the cookbox 102 advantageously improves the operating efficiency of the cooking engine of the grill 100, and also improves the heat distribution properties associated with the griddle 104 of the grill 100. In this regard, satisfaction of the above-described range of the distance 2404 at which the fourth row of ports 1516 of the respective burner tube is positioned inwardly from the rear wall 306 of the cookbox 102 advantageously assists in minimizing any temperature variation across the flat top cooking surface 1304 of the griddle 104 during cooking operations performed thereon.

In the illustrated example of FIGS. 20-25, the third row of ports 1514 formed on the outer wall 1506 of each of the burner tubes (e.g., the first burner tube 206, the second burner tube 208, and the third burner tube 210) is positioned inwardly from the front lip 1306 of the griddle 104 by an example distance 2406 of approximately 3.3 inches measured depthwise (e.g., along the central axis 1508 of the respective burner tube) from the front lip 1306 of the griddle 104 to the third row of ports 1514 of the respective burner tube. In other examples, the distance 2406 at which the third row of ports 1514 of the respective burner tube is positioned inwardly from the front lip 1306 of the griddle 104 can be between 1.0 and 6.0 inches. Satisfaction of the above-described range of the distance 2406 at which the third row of ports 1514 of the respective burner tube is positioned inwardly from the front lip 1306 of the griddle 104 advantageously improves the operating efficiency of the cooking engine of the grill 100, and also improves the heat distribution properties associated with the griddle 104 of the grill 100. In this regard, satisfaction of the above-described range of the distance 2406 at which the third row of ports 1514 of the respective burner tube is positioned inwardly from the front lip 1306 of the griddle 104 advantageously assists in minimizing any temperature variation across the flat top cooking surface 1304 of the griddle 104 during cooking operations performed thereon.

In the illustrated example of FIGS. 20-25, the fourth row of ports 1516 formed on the outer wall 1506 of each of the burner tubes (e.g., the first burner tube 206, the second burner tube 208, and the third burner tube 210) is positioned inwardly from the rear lip 1308 of the griddle 104 by an example distance 2408 of approximately 2.7 inches measured depthwise (e.g., along the central axis 1508 of the respective burner tube) from the rear lip 1308 of the griddle 104 to the fourth row of ports 1516 of the respective burner tube. In other examples, the distance 2408 at which the fourth row of ports 1516 of the respective burner tube is positioned inwardly from the rear lip 1308 of the griddle 104 can be between 1.0 and 6.0 inches. Satisfaction of the above-described range of the distance 2408 at which the fourth row of ports 1516 of the respective burner tube is positioned inwardly from the rear lip 1308 of the griddle 104 advantageously improves the operating efficiency of the cooking engine of the grill 100, and also improves the heat distribution properties associated with the griddle 104 of the grill 100. In this regard, satisfaction of the above-described range of the distance 2408 at which the fourth row of ports 1516 of the respective burner tube is positioned inwardly from the rear lip 1308 of the griddle 104 of the cookbox 102 advantageously assists in minimizing any temperature variation across the flat top cooking surface 1304 of the griddle 104 during cooking operations performed thereon.

In the illustrated example of FIGS. 20-25, the first recess 342 is configured to vent heated air generated within the cookbox 102 (e.g., heated air generated via the first burner tube 206, the second burner tube 208, and/or the third burner tube 210), with such venting occurring along the front wall 304 of the cookbox 102 at the location of the first recess 342. The second recess 344 is located opposite the first recess 342, and is configured to vent heated air generated within the cookbox 102 (e.g., heated air generated via the first burner tube 206, the second burner tube 208, and/or the third burner tube 210), with such venting occurring along the rear wall 306 of the cookbox 102 at the location of the second recess 344. The third recess 346 is configured to vent heated air generated within the cookbox 102 (e.g., heated air generated via the first burner tube 206, the second burner tube 208, and/or the third burner tube 210), with such venting occurring along the right sidewall 308 of the cookbox 102 at the location of the third recess 346. The fourth recess 348 is located opposite the third recess 346, and is configured to vent heated air generated within the cookbox 102 (e.g., heated air generated via the first burner tube 206, the second burner tube 208, and/or the third burner tube 210), with such venting occurring along the left sidewall 310 of the cookbox 102 at the location of the fourth recess 348.

As further shown in FIGS. 20-25, the underside 1402 of the griddle 104 extends across and/or covers the first recess 342 formed in the front wall 304 of the cookbox 102 and the second recess 344 formed in the rear wall 306 of the cookbox 102. In other examples, the underside 1402 of the griddle 104 might not extend across and/or cover the first recess 342 or the second recess 344. For example, the first recess 342 can be offset from and/or positioned forward of the front lip 1306 of the griddle 104, and the second recess 344 can be offset from and/or positioned rearward of the rear lip 1308 of the griddle 104. In the illustrated example of FIGS. 20-25, the underside 1402 of the griddle 104 does not extend across and/or cover the third recess 346 formed in the right sidewall 308 of the cookbox 102 or the fourth recess 348 formed in the left sidewall 310 of the cookbox 102. In this regard, the third recess 346 is offset from and/or positioned to the right of the right side lip 1310 of the griddle 104, and the fourth recess 348 is offset from and/or positioned to the left of the left side lip 1312 of the griddle 104. In other examples, underside 1402 of the griddle 104 can instead extend across and/or at least partially cover the third recess 346 formed in the right sidewall 308 of the cookbox 102 and/or the fourth recess 348 formed in the left sidewall 310 of the cookbox 102.

In the illustrated example of FIGS. 20-25, the heat shield 202 is coupled (e.g., via the first mounting flange 512 and the second mounting flange 514 of the heat shield 202) to the bottom wall 302 of the cookbox 102. The panel 502 of the heat shield 202 is spaced apart from and located below the bottom wall 302 of the cookbox 102, with the panel 502 extending across the first air intake opening 312 and the second air intake opening 314 formed in the bottom wall 302 of the cookbox 102. One or more first opening(s) from among the first plurality of openings 524 formed in the panel 502 of the heat shield 202 is/are located below and laterally aligned with the first air intake opening 312 formed in the bottom wall 302 of the cookbox 102, and one or more second opening(s) from among the second plurality of openings 526 formed in the panel 502 of the heat shield 202 is/are located below and laterally aligned with the second air intake opening 314 formed in the bottom wall 302 of the cookbox 102.

As shown in FIG. 24, the panel 502 of the heat shield 202 is positioned at an angle relative to the bottom wall 302 of the cookbox 102 such that the front edge 516 of the panel 502 is positioned below the rear edge 518 of the panel 502, and/or such that the front edge 516 of the panel 502 is spaced away from the bottom wall 302 of the cookbox 102 by a distance that is greater than the distance at which the rear edge 518 of the panel 502 is spaced away from the bottom wall 302 of the cookbox 102. In other examples, the panel 502 of the heat shield 202 can instead be positioned at an angle relative to the bottom wall 302 of the cookbox 102 such that the front edge 516 of the panel 502 is positioned above the rear edge 518 of the panel 502, and/or such that the front edge 516 of the panel 502 is spaced away from the bottom wall 302 of the cookbox 102 by a distance that is less than the distance at which the rear edge 518 of the panel 502 is spaced away from the bottom wall 302 of the cookbox 102. In still other examples, the panel 502 of the heat shield 202 can instead be parallel to the bottom wall 302 of the cookbox 102 such that the front edge 516 and the rear edge 518 of the panel 502 are both spaced away from the bottom wall 302 of the cookbox 102 by the same distance.

In the illustrated example of FIGS. 20-25, the first mounting flange 512 of the heat shield 202 is located to the right of the first air intake opening 312, and the second mounting flange 514 of the heat shield 202 is located to the left of the second air intake opening 314. The front lip 504 of the heat shield 202 is located forward of both the first air intake opening 312 and the second air intake opening 314, and the rear lip 506 of the heat shield 202 is located rearward of both the first air intake opening 312 and the second air intake opening 314. In other examples, the respective positions and/or locations of the first mounting flange 512, the second mounting flange 514, the front lip 504, and/or the rear lip 506 of the heat shield 202 relative to the first air intake opening 312 and/or the second air intake opening 314 of the cookbox 102 may differ from the position(s) and/or the location(s) shown in the example of FIGS. 20-25.

In the illustrated example of FIGS. 20-25, the temperature sensor assembly 204 is coupled to the cookbox 102. More specifically, the crossbar 702 of the temperature sensor assembly 204 is coupled to the cookbox 102, with the first end 802 of the crossbar 702 being coupled (e.g., via a first fastener) to the front wall 304 of the cookbox 102, and with the second end 804 of the crossbar 702 being coupled (e.g., via a second fastener) to the rear wall 306 of the cookbox 102. The crossbar 702 of the temperature sensor assembly 204 accordingly extends between the front wall 304 and the rear wall 306 of the cookbox 102. In the illustrated example of FIGS. 20-25, the first end 802 of the crossbar 702 is located along and/or within the first recess 342 formed in the front wall 304 of the cookbox 102, and the second end 804 of the crossbar 702 is located along and/or within the second recess 344 formed in the rear wall 306 of the cookbox 102. In other examples, the first end 802 and the second end 804 of the crossbar 702 can respectively be coupled to the front wall 304 and the rear wall 306 of the cookbox 102 without the first end 802 of the crossbar 702 being located along and/or within the first recess 342 formed in the front wall 304 of the cookbox 102, and/or without the second end 804 of the crossbar 702 being located along and/or within the second recess 344 formed in the rear wall 306 of the cookbox 102.

As shown in FIGS. 23 and 24, the temperature probe 706 of the temperature sensor assembly 204 is in the lowered position 1000 as a result of the griddle 104 being disposed on the cookbox 102. In this regard, the force associated with the weight of the griddle 104 contacting the temperature probe 706 causes the temperature probe 706 to be moved (e.g., to be slid) from the raised position 900 shown in FIG. 9 toward and/or into the lowered position 1000 shown in FIGS. 10, and further visible in FIGS. 23 and 24. As shown in FIGS. 23 and 24, the sensing tip 818 of the temperature probe 706 directly contacts the underside 1402 of the griddle 104, thereby enabling the sensing tip 818 to sense, measure, and/or detect the surface temperature of the underside 1402 of the griddle 104. The biasing force provided by the resiliency and/or the elasticity of the spring 708 of the temperature sensor assembly 204 advantageously maintains the direct contact between the sensing tip 818 of the temperature probe 706 and the underside 1402 of the griddle

104, thereby ensuring that the temperature probe 706 is accurately and reliably detecting the surface temperature of the underside 1402 of the griddle 104.

In the illustrated example of FIGS. 20-25, the temperature probe 706 of the temperature sensor assembly 204 is located above and laterally aligned with the first air intake opening 312 formed in the bottom wall 302 of the cookbox 102, with the temperature probe 706 being located between the first burner tube 206 and the second burner tube 208 of the grill 100. In other examples, the temperature probe 706 of the temperature sensor assembly 204 can instead be located above and laterally aligned with the second air intake opening 314 formed in the bottom wall 302 of the cookbox 102, with the temperature probe 706 being located between the second burner tube 208 and the third burner tube 210 of the grill 100. In still other examples, the temperature probe 706 of the temperature sensor assembly 204 can instead be located above and laterally aligned with a solid portion of the bottom wall 302 of the cookbox 102, including either the solid portion 316 that is located between the first air intake opening 312 and the second air intake opening 314, a solid portion that is located to the right of the first air intake opening 312, or a solid portion that is located to the left of the second air intake opening 314.

The grill 100 of FIGS. 1-25 is configured for optimum efficiency and optimum heat distribution during cooking operations performed on the flat top cooking surface 1304 of the griddle 104. More specifically, the grill 100 is configured to minimize any temperature variation across the flat top cooking surface 1304 of the griddle 104 during cooking operations performed thereon. As shown in FIG. 22, the flat top cooking surface 1304 of the griddle 104 includes an example central portion 2202 that is bounded and/or circumscribed by an example peripheral portion 2204. In the illustrated example, the peripheral portion 2204 of the flat top cooking surface 1304 extends approximately three inches inwardly from each of the four surrounding lips of the griddle 104 (e.g., the front lip 1306, the rear lip 1308, the right side lip 1310, and the left side lip 1312). The grill 100 of FIGS. 1-25 is configured such that the average temperature within the central portion 2202 of the flat top cooking surface 1304 of the griddle 104 is approximately 375 degrees Fahrenheit (375° F.) when the burner tubes (e.g., the first burner tube 206, the second burner tube 208, and the third burner tube 210) of the grill 100 are adjusted to a LOW output setting, approximately 420 degrees Fahrenheit (420° F.) when the burner tubes of the grill 100 are adjusted to a MEDIUM output setting, and approximately 560 degrees Fahrenheit (560° F.) when the burner tubes of the grill 100 are adjusted to a HI output setting. As a result of implementing the innovative heat distribution features described above, the grill 100 of FIGS. 1-25 is advantageously configured such that the average temperature variation between the central portion 2202 and the peripheral portion 2204 of the flat top cooking surface 1304 of the griddle 104 is approximately 60 degrees Fahrenheit (60° F.) or less when the burner tubes of the grill 100 are adjusted to a LOW output setting, approximately 90 degrees Fahrenheit (90° F.) or less when the burner tubes of the grill 100 are adjusted to a MEDIUM output setting, and approximately 140 degrees Fahrenheit (140° F.) or less when the burner tubes of the grill 100 are adjusted to a HI output setting. The above-described temperature variations are substantially less than those found in many commercially available flat top gas grills, some of which produce flat top cooking surface temperature variations exceeding two hundred degrees Fahrenheit (200° F.) when the burner tubes of the flat top gas grill are adjusted to a common output setting.

The following paragraphs provide various examples in relation to the disclosed flat top gas grills including cooking engines configured for optimum heat distribution.

Example 1 includes a grill. In Example 1, the grill includes a cookbox, a heat shield, a griddle, and a plurality of burner tubes. The cookbox includes a bottom wall, a front wall, a rear wall, a right sidewall, and a left sidewall. The front wall, the rear wall, the right sidewall, and the left sidewall extend upwardly from the bottom wall. The cookbox further includes a plurality of air intake openings extending though the bottom wall. The heat shield includes a panel spaced apart from and located below the bottom wall of the cookbox. The panel extends across the plurality of air intake openings. The griddle is disposed on or above the cookbox. The griddle includes a flat top cooking surface and an underside located opposite the flat top cooking surface. The burner tubes are disposed in the cookbox and located between the bottom wall of the cookbox and the underside of the griddle.

Example 2 includes the grill of Example 1. In Example 2, the heat shield includes a plurality of openings extending through the panel.

Example 3 includes the grill of Example 1. In Example 3, the panel of the heat shield is positioned at an angle relative to the bottom wall of the cookbox. A front edge of the panel is positioned below a rear edge of the panel.

Example 4 includes the grill of Example 1. In Example 4, the heat shield includes a first mounting flange and a second mounting flange respectively configured to couple the heat shield to the bottom wall of the cookbox.

Example 5 includes the grill of Example 1. In Example 5, the plurality of burner tubes includes a first burner tube, a second burner tube laterally spaced apart from the first burner tube, and a third burner tube laterally spaced apart from both the first burner tube and the second burner tube. In Example 5, the plurality of air intake openings includes a first air intake opening and a second air intake opening laterally spaced apart from the first air intake opening. The first air intake opening is laterally positioned between the first burner tube and the second burner tube, and the second air intake opening is laterally positioned between the second burner tube and the third burner tube.

Example 6 includes the grill of Example 5. In Example 6, the heat shield includes a first plurality of openings and a second plurality of openings respectively extending through the panel. The second plurality of openings is laterally spaced apart from the first plurality of openings. The first plurality of openings includes one or more first openings laterally aligned with the first air intake opening. The second plurality of openings includes one or more second openings laterally aligned with the second air intake opening.

Example 7 includes the grill of Example 1. In Example 7, the front wall, the rear wall, the right sidewall, and the left sidewall define an upper rim of the cookbox. The upper rim includes at least one recess configured to vent heat generated within the cookbox.

Example 8 includes the grill of Example 7. In Example 8, the at least one recess includes a first recess located along an inner edge of an upper surface of the front wall, a second recess located along an inner edge of an upper surface of the rear wall, a third recess located along an inner edge of an upper surface of the right sidewall, and a fourth recess located along an inner edge of an upper surface of the left sidewall.

Example 9 includes the grill of Example 8. In Example 9, the first recess extends between the upper surface of the front wall and an inner surface of the front wall, the second recess extends between the upper surface of the rear wall and an inner surface of the rear wall, the third recess extends between the upper surface of the right sidewall and an inner surface of the right sidewall, and the fourth recess extends between the upper surface of the left sidewall and an inner surface of the left sidewall.

Example 10 includes the grill of Example 1. In Example 10, the grill further includes a temperature sensor assembly coupled to the cookbox. The temperature sensor assembly includes a temperature probe configured to contact the underside of the griddle. The temperature probe is movable relative to the cookbox between a raised position and a lowered position. The temperature probe is biased into the raised position via a spring of the temperature sensor assembly.

Example 11 includes the grill of Example 10. In Example 11, the temperature sensor assembly further includes a crossbar and a mounting bracket. The crossbar is coupled to and extends between the front wall and the rear wall of the cookbox. The mounting bracket is coupled to the crossbar. The mounting bracket includes an upper flange and a lower flange spaced apart from the upper flange. The temperature probe is slidingly received in the mounting bracket via an opening formed in the upper flange and an opening formed in the lower flange. The temperature probe includes a retention flange located between the upper flange and the lower flange. The spring is operatively positioned between the retention flange of the temperature probe and the lower flange of the mounting bracket such that the spring biases the retention flange of the temperature probe toward the upper flange of the mounting bracket.

Example 12 includes the grill of Example 1. In Example 12, the bottom wall has a total area defined by a width extending between the right sidewall and the left sidewall and a depth extending between the front wall and the rear wall. Each one of the plurality of air intake openings has an associated area. The respective associated areas of the plurality of air intake openings collectively define an unoccupied area of the bottom wall. The unoccupied area is between 10.0 and 30.0 percent of the total area.

Example 13 includes the grill of Example 1. In Example 13, the plurality of burner tubes includes a linear burner tube having a central axis vertically positioned between 1.5 and 3.5 inches above the bottom wall of the cookbox, and vertically positioned between 3.0 and 6.0 inches below the underside of the griddle.

Example 14 includes the grill of Example 1. In Example 14, the plurality of burner tubes includes a linear burner tube having a central axis, an outer wall, a first row of ports extending through the outer wall and arranged parallel to the central axis, and a second row of ports extending through the outer wall and arranged parallel to the central axis. The second row of ports is spaced apart from the first row of ports. The outer wall of the linear burner tube has a circular cross-sectional profile. The second row of ports is angularly displaced from the first row of ports by an angle between 90.0 and 150.0 degrees.

Example 15 includes the grill of Example 14. In Example 15, the linear burner tube further includes a third row of ports extending through the outer wall and arranged perpendicular to the central axis, and a fourth row of ports extending through the outer wall and arranged perpendicular to the central axis. The fourth row of ports is spaced apart from the third row of ports. The third row of ports is located between 1.0 and 6.0 inches inwardly from the front wall of the cookbox, and the fourth row of ports is located between 1.0 and 6.0 inches inwardly from the rear wall of the cookbox.

Example 16 includes a grill. In Example 16, the grill includes a cookbox, a griddle, and a plurality of burner tubes. The cookbox includes a bottom wall, a front wall, a rear wall, a right sidewall, and a left sidewall. The front wall, the rear wall, the right sidewall, and the left sidewall extend upwardly from the bottom wall and define an upper rim of the cookbox. The upper rim includes at least one recess configured to vent heat generated within the cookbox. The griddle is disposed on or above the cookbox. The griddle includes a flat top cooking surface and an underside located opposite the flat top cooking surface. The burner tubes are disposed in the cookbox and located between the bottom wall of the cookbox and the underside of the griddle.

Example 17 includes the grill of Example 16. In Example 17, the at least one recess includes a first recess located along an inner edge of an upper surface of the front wall, a second recess located along an inner edge of an upper surface of the rear wall, a third recess located along an inner edge of an upper surface of the right sidewall, and a fourth recess located along an inner edge of an upper surface of the left sidewall.

Example 18 includes the grill of Example 17. In Example 18, the first recess extends between the upper surface of the front wall and an inner surface of the front wall, the second recess extends between the upper surface of the rear wall and an inner surface of the rear wall, the third recess extends between the upper surface of the right sidewall and an inner surface of the right sidewall, and the fourth recess extends between the upper surface of the left sidewall and an inner surface of the left sidewall.

Example 19 includes a grill. In Example 19, the grill includes a cookbox, a griddle, a plurality of burner tubes, and a temperature sensor assembly. The cookbox includes a bottom wall, a front wall, a rear wall, a right sidewall, and a left sidewall. The front wall, the rear wall, the right sidewall, and the left sidewall extend upwardly from the bottom wall. The griddle is disposed on or above the cookbox. The griddle includes a flat top cooking surface and an underside located opposite the flat top cooking surface. The burner tubes are disposed in the cookbox and located between the bottom wall of the cookbox and the underside of the griddle. The temperature sensor assembly is coupled to the cookbox. The temperature sensor assembly includes a temperature probe configured to contact the underside of the griddle. The temperature probe is movable relative to the cookbox between a raised position and a lowered position. The temperature probe is biased into the raised position via a spring of the temperature sensor assembly.

Example 20 includes the grill of Example 19. In Example 20, the temperature sensor assembly further includes a crossbar and a mounting bracket. The crossbar is coupled to and extends between the front wall and the rear wall of the cookbox. The mounting bracket is coupled to the crossbar. The mounting bracket includes an upper flange and a lower flange spaced apart from the upper flange. The temperature probe is slidingly received in the mounting bracket via an opening formed in the upper flange and an opening formed in the lower flange. The temperature probe includes a retention flange located between the upper flange and the lower flange. The spring is operatively positioned between the retention flange of the temperature probe and the lower flange of the mounting bracket such that the spring biases the retention flange of the temperature probe toward the upper flange of the mounting bracket.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A grill, comprising:

a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending through the bottom wall;

a heat shield including a panel spaced apart from and located below the bottom wall of the cookbox, the panel extending across the plurality of air intake openings, the panel positioned at an angle relative to the bottom wall such that a front edge of the panel is positioned below a rear edge of the panel;

a griddle disposed on or above the cookbox, the griddle including a flat top cooking surface and an underside located opposite the flat top cooking surface; and a plurality of burner tubes disposed in the cookbox and located between the bottom wall of the cookbox and the underside of the griddle.

2. The grill of claim 1, wherein the heat shield includes a plurality of openings extending through the panel.

3. The grill of claim 1, wherein the heat shield includes a first mounting flange and a second mounting flange respectively configured to couple the heat shield to the bottom wall of the cookbox.

4. The grill of claim 1, wherein the plurality of burner tubes includes a first burner tube, a second burner tube laterally spaced apart from the first burner tube, and a third burner tube laterally spaced apart from both the first burner tube and the second burner tube, wherein the plurality of air intake openings includes a first air intake opening and a second air intake opening laterally spaced apart from the first air intake opening, wherein the first air intake opening is laterally positioned between the first burner tube and the second burner tube, and the second air intake opening is laterally positioned between the second burner tube and the third burner tube.

5. The grill of claim 4, wherein the heat shield includes a first plurality of openings and a second plurality of openings respectively extending through the panel, wherein the second plurality of openings is laterally spaced apart from the first plurality of openings, wherein the first plurality of openings includes one or more first openings laterally aligned with the first air intake opening, wherein the second plurality of openings includes one or more second openings laterally aligned with the second air intake opening.

6. The grill of claim 1, wherein the front wall, the rear wall, the right sidewall, and the left sidewall define an upper rim of the cookbox, the upper rim including at least one recess configured to vent heat generated within the cookbox.

7. The grill of claim 6, wherein the at least one recess includes a first recess located along an inner edge of an upper surface of the front wall, a second recess located along an inner edge of an upper surface of the rear wall, a third recess located along an inner edge of an upper surface of the right sidewall, and a fourth recess located along an inner edge of an upper surface of the left sidewall.

8. The grill of claim 7, wherein the first recess extends between the upper surface of the front wall and an inner surface of the front wall, the second recess extends between the upper surface of the rear wall and an inner surface of the rear wall, the third recess extends between the upper surface of the right sidewall and an inner surface of the right sidewall, and the fourth recess extends between the upper surface of the left sidewall and an inner surface of the left sidewall.

9. The grill of claim 1, further comprising a temperature sensor assembly coupled to the cookbox, the temperature sensor assembly including a temperature probe configured to contact the underside of the griddle, the temperature probe movable relative to the cookbox between a raised position and a lowered position, the temperature probe biased into the raised position via a spring of the temperature sensor assembly.

10. The grill of claim 9, wherein the temperature sensor assembly further includes:

a crossbar coupled to and extending between the front wall and the rear wall of the cookbox; and a mounting bracket coupled to the crossbar, the mounting bracket including an upper flange and a lower flange spaced apart from the upper flange, wherein the temperature probe is slidingly received in the mounting bracket via an opening formed in the upper flange and an opening formed in the lower flange, the temperature probe including a retention flange located between the upper flange and the lower flange, wherein the spring is operatively positioned between the retention flange of the temperature probe and the lower flange of the mounting bracket such that the spring biases the retention flange of the temperature probe toward the upper flange of the mounting bracket.

11. The grill of claim 1, wherein the bottom wall has a total area defined by a width extending between the right sidewall and the left sidewall and a depth extending between the front wall and the rear wall, wherein each one of the plurality of air intake openings has an associated area, wherein the respective associated areas of the plurality of air intake openings collectively define an unoccupied area of the bottom wall, and wherein the unoccupied area is between 10.0 and 30.0 percent of the total area.

12. The grill of claim 1, wherein the plurality of burner tubes includes a linear burner tube having a central axis vertically positioned between 1.5 and 3.5 inches above the bottom wall of the cookbox, and vertically positioned between 3.0 and 6.0 inches below the underside of the griddle.

13. The grill of claim 1, wherein the plurality of burner tubes includes a linear burner tube having a central axis, an outer wall, a first row of ports extending through the outer wall and arranged parallel to the central axis, and a second row of ports extending through the outer wall and arranged parallel to the central axis, the second row of ports spaced apart from the first row of ports, wherein the outer wall of the linear burner tube has a circular cross-sectional profile, and wherein the second row of ports is angularly displaced from the first row of ports by an angle between 90.0 and 150.0 degrees.

14. The grill of claim 13, wherein the linear burner tube further includes a third row of ports extending through the outer wall and arranged perpendicular to the central axis, and a fourth row of ports extending through the outer wall and arranged perpendicular to the central axis, the fourth row of ports spaced apart from the third row of ports, wherein the third row of ports is located between 1.0 and 6.0 inches inwardly from the front wall of the cookbox, and the fourth row of ports is located between 1.0 and 6.0 inches inwardly from the rear wall of the cookbox.

15. A grill, comprising:

a cookbox including a bottom wall, a front wall, a rear wall, a right sidewall, and a left sidewall, the front wall, the rear wall, the right sidewall, and the left sidewall extending upwardly from the bottom wall and defining an upper rim of the cookbox, the upper rim including at least one recess configured to vent heat generated within the cookbox;

a griddle disposed on or above the cookbox, the griddle including a flat top cooking surface and an underside located opposite the flat top cooking surface; and a plurality of burner tubes disposed in the cookbox and located between the bottom wall of the cookbox and the underside of the griddle.

16. The grill of claim 15, wherein the at least one recess includes a first recess located along an inner edge of an upper surface of the front wall, a second recess located along an inner edge of an upper surface of the rear wall, a third recess located along an inner edge of an upper surface of the right sidewall, and a fourth recess located along an inner edge of an upper surface of the left sidewall.

17. The grill of claim 16, wherein the first recess extends between the upper surface of the front wall and an inner surface of the front wall, the second recess extends between the upper surface of the rear wall and an inner surface of the rear wall, the third recess extends between the upper surface of the right sidewall and an inner surface of the right sidewall, and the fourth recess extends between the upper surface of the left sidewall and an inner surface of the left sidewall.

18. A grill, comprising:

a cookbox including a bottom wall, a front wall, a rear wall, a right sidewall, and a left sidewall, the front wall, the rear wall, the right sidewall, and the left sidewall extending upwardly from the bottom wall;

a griddle disposed on or above the cookbox, the griddle including a flat top cooking surface and an underside located opposite the flat top cooking surface;

a plurality of burner tubes disposed in the cookbox and located between the bottom wall of the cookbox and the underside of the griddle; and a temperature sensor assembly coupled to the cookbox, the temperature sensor assembly including a temperature probe configured to contact the underside of the griddle, the temperature probe movable relative to the cookbox between a raised position and a lowered position, the temperature probe biased into the raised position via a spring of the temperature sensor assembly, the temperature sensor assembly further including:

a crossbar coupled to and extending between the front wall and the rear wall of the cookbox; and a mounting bracket coupled to the crossbar, the mounting bracket including an upper flange and a lower flange spaced apart from the upper flange, wherein the temperature probe is slidingly received in the mounting bracket via an opening formed in the upper flange and an opening formed in the lower flange, the temperature probe including a retention flange located between the upper flange and the lower flange, wherein the spring is operatively positioned between the retention flange of the temperature probe and the lower flange of the mounting bracket such that the spring biases the retention flange of the temperature probe toward the upper flange of the mounting bracket.

19. A grill, comprising:

a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending through the bottom wall;

a heat shield including a panel spaced apart from and located below the bottom wall of the cookbox, the panel extending across the plurality of air intake openings, the heat shield further including a first mounting flange and a second mounting flange respectively configured to couple the heat shield to the bottom wall of the cookbox;

a griddle disposed on or above the cookbox, the griddle including a flat top cooking surface and an underside located opposite the flat top cooking surface; and a plurality of burner tubes disposed in the cookbox and located between the bottom wall of the cookbox and the underside of the griddle.

20. The grill of claim 19, wherein the heat shield includes a plurality of openings extending through the panel.

* * * * *